United States Patent [19]
Liu et al.

[11] Patent Number: 5,339,265
[45] Date of Patent: Aug. 16, 1994

[54] OPTIMAL UNIFIED ARCHITECTURES FOR THE REAL-TIME COMPUTATION OF TIME-RECURSIVE DISCRETE SINUSOIDAL TRANSFORMS

[75] Inventors: K. J. Ray Liu, Silver Spring, Md.; Chin-Te Chiu, Chiayi, Taiwan

[73] Assignee: University of Maryland at College Park, College Park, Md.

[21] Appl. No.: 937,100

[22] Filed: Aug. 31, 1992

[51] Int. Cl.⁵ .............................................. G06F 7/38
[52] U.S. Cl. .................................................. 364/725
[58] Field of Search ....................... 364/725, 726, 727

[56] References Cited

U.S. PATENT DOCUMENTS

| | | | |
|---|---|---|---|
| 4,288,858 | 9/1981 | Merola et al. | 364/725 X |
| 4,385,363 | 5/1983 | Widergren et al. | 364/725 |
| 4,449,194 | 5/1984 | Wilhelm | 364/725 |
| 4,504,923 | 3/1985 | Schlunt et al. | 364/728 |
| 4,674,125 | 6/1987 | Carlson et al. | 382/49 |
| 4,679,163 | 7/1987 | Arnould et al. | 364/725 |
| 4,760,543 | 7/1988 | Ligtenberg et al. | 364/725 |
| 4,791,598 | 12/1988 | Liou et al. | 364/725 |
| 4,797,847 | 1/1989 | Dunhamel | 364/725 |
| 4,831,440 | 5/1989 | Borgers et al. | 364/725 X |
| 4,831,574 | 5/1989 | Dunhamel | 364/725 |
| 4,849,922 | 7/1989 | Riolfo | 364/725 |
| 4,881,192 | 11/1989 | Woudsma et al. | 364/725 |
| 5,053,985 | 10/1991 | Friedlander et al. | 364/725 |

OTHER PUBLICATIONS

"A fast recursive algorithm . . . " published in the IEEE Transactions: Acoustic, Speech, Signal Processing, vol. ASSP-35 on pp. 1455–1461 In Oct. 1987 and authored by H. S. Hou.
"A fast computational algorithm for the discrete cosine transform" published in the IEEE Transactions: Communication, vol. COM-25 on pp. 1004–1009 in Sep. 1977 and authored by W. H. Chen, C. H. Smith and S. C. Fralick.
"A new algorithm to compute the discrete transform" published in the IEEE Transactions: Acoustics, Speech, Signal Processing, vol. ASSP-32 on pp. 1243–1245 in Dec. 1984 and authored by B. G. Lee.
"Unified Parallel Lattice Structures for Time-Recursive Discrete Cosine/Sine/Hartley Transforms", IEEE Transactions on Signal Processing, by K. J. R. Liu and C. T. Chiu. IEEE vol. 41, No. 3, pp. 1357–1377, Mar., 1993.
"Real-Time Parallel and Fully-Pinelined Two Dimensional DCT Lattice Structures with Application to HDTV Systems", IEEE Transactions on Circuits and Systems for Video Technology, vol. II, No. 1, pp. 25–37, Mar., 1992, by K. J. R. Liu and C. T. Chiu.
"VLSI Implementation of Real Time Parallel DCT/DST Lattice Structures for Video Communications", published by: VLSI Signal Processing, V, pp. 101–110, IEEE Press, Oct., 1992, by C. T. Chiu, R. K. Kolagotla, K. J. R. Liu and J. F. JaJa, Electrical Engineering Dept., Systems Research Center, UMCP.

*Primary Examiner*—Jerry Smith
*Assistant Examiner*—Chuong D. Ngo
*Attorney, Agent, or Firm*—Fisher & Associates

[57] ABSTRACT

A universal transform processor using at least a one dimensional (1-D) transform processor to produce N dimensional transforms without transposition and providing a fully pipelined structure with a through put rate of N clock cycles for an $N \times N$ successive serial input with parallel output data. The universal transform processor can efficiently compute Discrete Cosine, Sine, Hartley, Fourier, Lapped Orthogonal, and Complex Lapped transforms for continuous input data stream. The architecture is regular, modular, and has only local interconnections in both data and control paths. The universal transform processor is practical for very large scale integrated (VLSI) implementation.

23 Claims, 20 Drawing Sheets

Half latch        Reset control half latch

Lattice Array Block 0

Lattice Array Block i, i=1,2,3,...,N-1.

Filter Array Block 0

Filter Array Block i, i=1,2,3,...,N-1.

Filter Array Block 0

Filter Array Block i, i=1,2,3,...,N-1.

OPTIMAL UNIFIED ARCHITECTURES FOR THE REAL-TIME COMPUTATION OF TIME-RECURSIVE DISCRETE SINUSOIDAL TRANSFORMS

BACKGROUND OF THE INVENTION

The invention relates to transform processors, and more specifically, to real time discrete sinusoidal transform processors.

Discrete sinusoidal transforms play significant roles in various digital signal processing applications, such as spectrum analysis, image and speech signal processing, computer tomography, data compression, and signal reconstruction. Among different discrete sinusoidal transforms, the discrete cosine transform (DCT), the discrete sine transform (DST), discrete Hartley transform (DHT), and the discrete Fourier transform (DFT), are widely used because of their efficient performance. Recently, the Lapped Orthogonal Transform (LOT) and the Complex Lapped Transform (CLT) were introduced for transform coding with significantly reduced blocking effects and for motion estimation.

In the prior art, various special purpose computers and processor chips have been designed to accommodate specific operations. The algorithms specific to various transforms were implemented in hardware only designed to accommodate the handful of related algorithm transforms. This provided a simple solution to each transform problem, yet did not address the collective problem of solving a family of transforms. Examples of these include U.S. Pat. Nos. 4,760,543 (Ligtenberg et al.), 4,797,847 (Dunhamel), 4,679,163 (Arnould et al.), 4,831,574 (Dunhamel), 4,385,363 (Widergren et al.), 4,831,440 (Borgers et al.), 4,881,192 (Woudsma et al.), 4,791,598 (Liou et al.), 4,288,858 (Merola et al.), 4,674,125 (Carlson et al.), 4,849,922 (Riolfo), 5,053,985 (Friedlander et al.), and 4,449,194 (Wilhelm).

Various "fast" algorithms have been proposed in the past. Some of the more well-known in the art are disclosed in the following articles:

"A fast recursive algorithm . . . " published in the IEEE Transactions: Acoustic, Speech, Signal Processing, Vol. ASSP-35 on pages 1455-1461 in October 1987 and authored by H. S. Hou;

"A fast computational algorithm for the discrete cosine transform" published in the IEEE Transactions: Communication, vol. COM-25 on pages 1004-1009 in September 1977 and authored by W. H. Chen, C. H. Smith and S. C. Fralick;

"A new algorithm to compute the discrete cosine transform" published in the IEEE Transactions: Acoustics, Speech, Signal Processing, vol. ASSP-32 on pages 1243-1245 in December 1984 and authored by B. G. Lee.

Though these fast transforms have been implemented in hardware, the efficiency is reduced by architectural implementation and design constraints. Some factors retarding their functionality are large numbers of multipliers, latency and limitation on transform size N.

The prior art devices do not simultaneously produce both DCT and DST signals. In the past to provide DCT and DST a transposition was required. A single design for a transform processor wherein implementation in either lattice structure or infinite impulse response (IIR) filter structure has yet to be proposed. In past designs, the interconnections were global, not local, for optimal VLSI design. The past architectures have some limitations to the number of N-point data. The time-recursive nature of discrete sinusoidal transforms (DXT) was not used in the design and implementation of prior art devices.

In real-time signal processing applications, especially in speech and image communications and radar/sonar signal processing, input data arrives serially. In prior art fast Fourier transforms (FFT) based algorithms, serial data is buffered and then transformed using FFT scheme of complexity O(N log N), where is O is the order of complexity and N is the transform size. Buffering the data requires O(N) time. In the prior art, "fast" algorithm based architectures required O(log N) time using O(N log N) hardware. This increases complexity of the processor, reduces effectiveness of VLSI design implementation and slows down overall transform speed.

In recent years visualized communications have become an expanding market, due to recent advances of video/image data compression and maturity of very large scale integrated (VLSI) technology. Digital processing of video signals has come of age and their applications related to video signal processing such as video phone, high definition television (HDTV), video conferencing, and multimedia are of great interest.

In the field of digital video and its applications, various groups have been working on standardizing and simplifying the art. Many options have been proposed by the Joint Photographic Experts Group (JPEG)), the International Telegraph and Telephone Consultative Committee (CCITT), and the Moving Picture Experts Group (MPEG). None of the techniques proposed performed as well as the market needs.

SUMMARY OF THE INVENTION

The present invention may be implemented in either lattice structure (1) or IIR filter structure (2). The two structures are similar in every detail except were a lattice module is located, it is replaced by an IIR filter. The equivalent IIR is derived using the transfer function of the specific lattice structure. The transfer functions of various discrete transforms may be generalized and used to implement a universal filter module. The configuration of the architecture is dependent upon user requirements. In time-recursive lattice architecture, two transforms called dual generated pairs, are obtained simultaneously. The result is providing both DCT and DST simultaneously. A systematic approach to derive the time-recursive unified filter architecture for any discrete transform is disclosed. The resulting unified filter architectures have similar second order autoregressive structure with minimum number of multipliers. This time-recursive technique may be generalized to multi-dimensional transforms by using only a one-dimensional transform architecture and simple shift registers. The resulting design is asymptotically optimal in speed and area.

The present invention uses a 1-D transform processor as a building block for obtaining various transform processors. The 1-D DCT/DST Lattice structure (as shown in FIG. 3) comprises read only memory (ROM) (10 and 20), adders (30), shift register (40), latches (50 and 60) and feedback loops. The two output signals at nodes (2) and (3) are DCT and DST respectively of the input signal applied to node (1). The ROMs are used for both implementing the algorithm and multiplication functions. Clocking is provided so that computations are performed on both phases. The IIR filter equivalent can be obtained by replacing the lattice array with a filter array.

The present invention provides a universal transform processor using at least one 1-D transform processor to produce N dimensional transforms without transposition. The present invention also provides a fully pipelined structure with a throughput of N clock cycles for N X N successive serial inputs as well as parallel or serial outputs. Additionally, both DST and DCT are produced simultaneously.

The present invention merges buffering and transform operations into a single unit of total hardware complexity O(N). Therefore the present architecture needs only a constant time with O(N) hardware. The present architectures generate time-recursive transforms, not limited to block transforms. Further, unlike FFT's, the present invention has only local interconnections and thus, is better suited for VLSI design.

The present invention may be implemented to efficiently perform functions using only two one dimensional DCT processors with throughput rate of N clock cycles for N X N successive input data frames without boundary on N.

The present invention allows a family of sinusoidal transforms to be implemented in hardware and fabricated in VLSI with real time processor speed. Other objects and features of the present invention will be apparent from the following detailed description of the preferred embodiment.

DESCRIPTION OF THE PREFERRED EMBODIMENTS

Parallel 1-D DCT/DST Lattice Structure

Figure 1A:
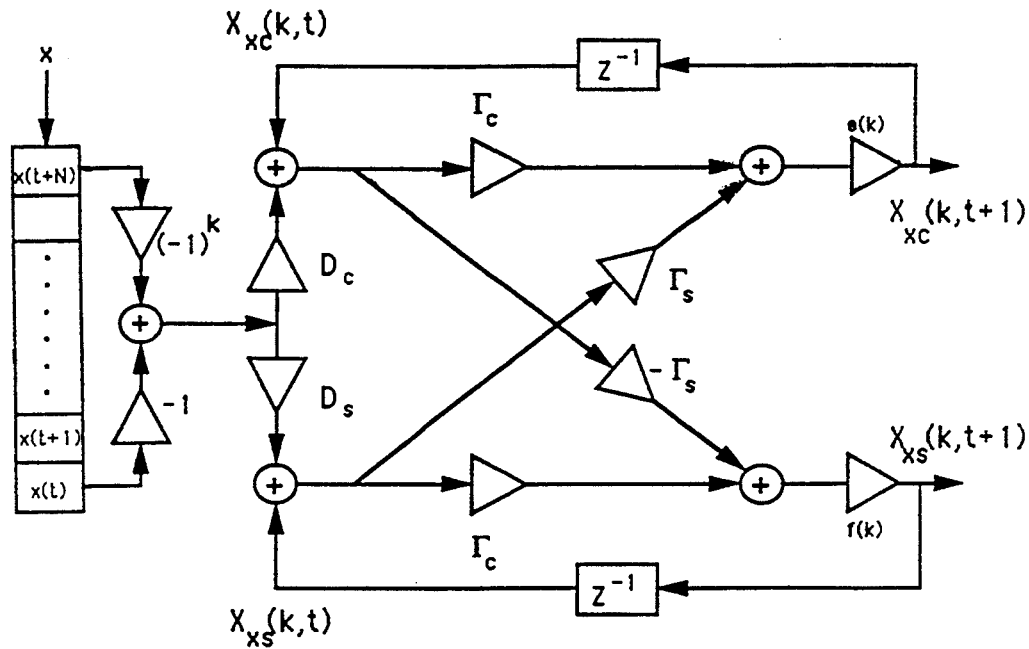
FIGS. 1a and 1b are block diagrams showing a universal lattice module constructed in accordance with a preferred embodiment of the invention.

A new scheme employing a time-recursive approach is presented. Since data arrives serially, in digital signal transmission, the orthogonal transforms are considered from a time-recursive point of view, instead of an entire block of data at a time. This is denoted as $X_c(k,t)$ and $X_s(k,t)$ as the DCT and DST of a data sequence. The time-recursive relation for the new transforms $X_c(k,t+1)$ and $X_s(k,t+1)$ in terms of the previous transforms $X_c(k,t)$ and $X_s(k,t)$ are given by:

$$X_{xc}(k,t+1) = e(k) \{[X_{xc}(k,t) + [x(t+N)(-1)^k - x(t)]D_c]T_c + [X_{xs}(k,t) + [x(t+N)(-1)^k - x(t)]D_s]T_s\}$$

and $$X_{xs}(k,t+1) = f(k) \{[X_{xs}(k,t) + [x(t+N)(-1)^k - x(t)]D_s]T_c - [X_{xc}(k,t) + [x(t+N)(-1)^k - x(t)]D_c]T_s\}$$

The lattice module manifesting this approach is shown in FIG. 1, for k=0,1,2, ... , N−1. It should be noted that the transform domain data X(k,t) has been decomposed into N disjoint components that use similar lattice modules with different multipliers coefficients in them. This structure requires 6N−8 multipliers and 5N−1 adders. The total computational time is N clock cycles. It is important to note that the transformed data of subsequent input vectors may be generated every clock cycle.

Distributed-Arithmetic based Implementation

Since the lattice module is the most important component in DCT/DST lattice structures, this discussion will focus on the VLSI implementation of the lattice module. Every lattice module in the DCT/DST structure is a modified normal form digital filter, which has the least roundoff noise and is less sensitive to coefficient inaccuracy. In the following discussion we will use an 8-point DCT with 8-bit input signals and 12-bit output signals using two's complement binary number system as an example.

The distributed-arithmetic scheme our VLSI implements was first disclosed in two publications "VLSI implementation of 16×16 Discrete Cosine Transform," published in IEEE Transactions on Circuits and Systems, vol. 36, No. 4 on pages 610–617 in April 1989 and "Application of Distributed Arithmetic to Digital Signal Processing-Tutorial Review," published in IEEE ASSP Magazine on pages 4–19 in July 1989. Multiplication results stored in ROM are computed using double precision numbers on a SUN workstation. Using this realization, roundoff errors due to multiplication are minimized since distributed-arithmetic, transforms explicit multiplication into implicit multiplication. Therefore, system errors are due to the quantization errors resulting from finite precision implementation and addition operations. Under the 12-bit two's complement realization, root mean square (RMS) error values are approximately 40 dB, which is satisfactory for most applications.

One way to implement the lattice module is to realize two multipliers with same input by one ROM, Using this method, the ROM size of each lattice array is 13824 bits and the number of adders needed is 10. When the number of bits of the input signal is reduced, ROM size is reduced but the number of adders is increased. The adder is a 12-bit carry look-ahead full adder/subtracter which is constructed using three 4-bit carry look-ahead adders. Since ROMS need less area than general purpose multipliers and can achieve a higher speed, circuit implementations using this approach can be used for very high speed video signal processing.

Design of the Building Blocks

Figure 3A:
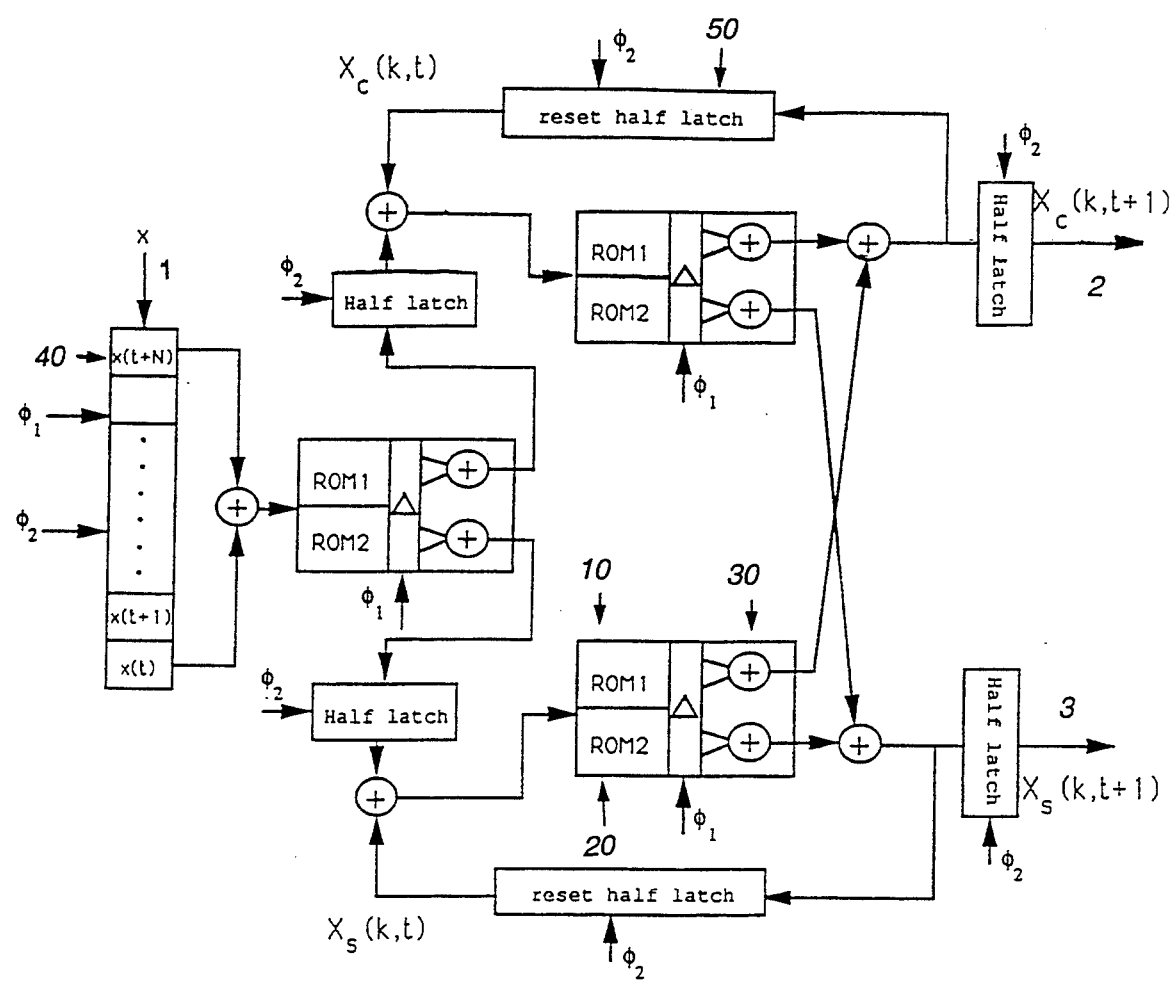
FIGS. 3a through 3f are diagrams and schematics showing building blocks of a lattice module with clocks.

Turning now to FIG. 3a, the main building blocks of the lattice structure, ROMs 10 and 20, adders 30, shift registers 40, and latches 50 are illustrated. These components will be described individually in this section. The critical path in the lattice modules is the feedback loop which includes one ROM and three adders. A traditional two-phase clocking scheme would use one phase to perform these computations and a second phase to latch the results. In order to make the two phases of the clock more symmetric, computations are performed on both phases of the clock. As shown in FIG. 3a, one addition and a ROM lookup is performed during the first phase and two additions are performed during the second phase. Intermediate results are stored in half-latches as described below.

ROM Implementation

Figure 3B:
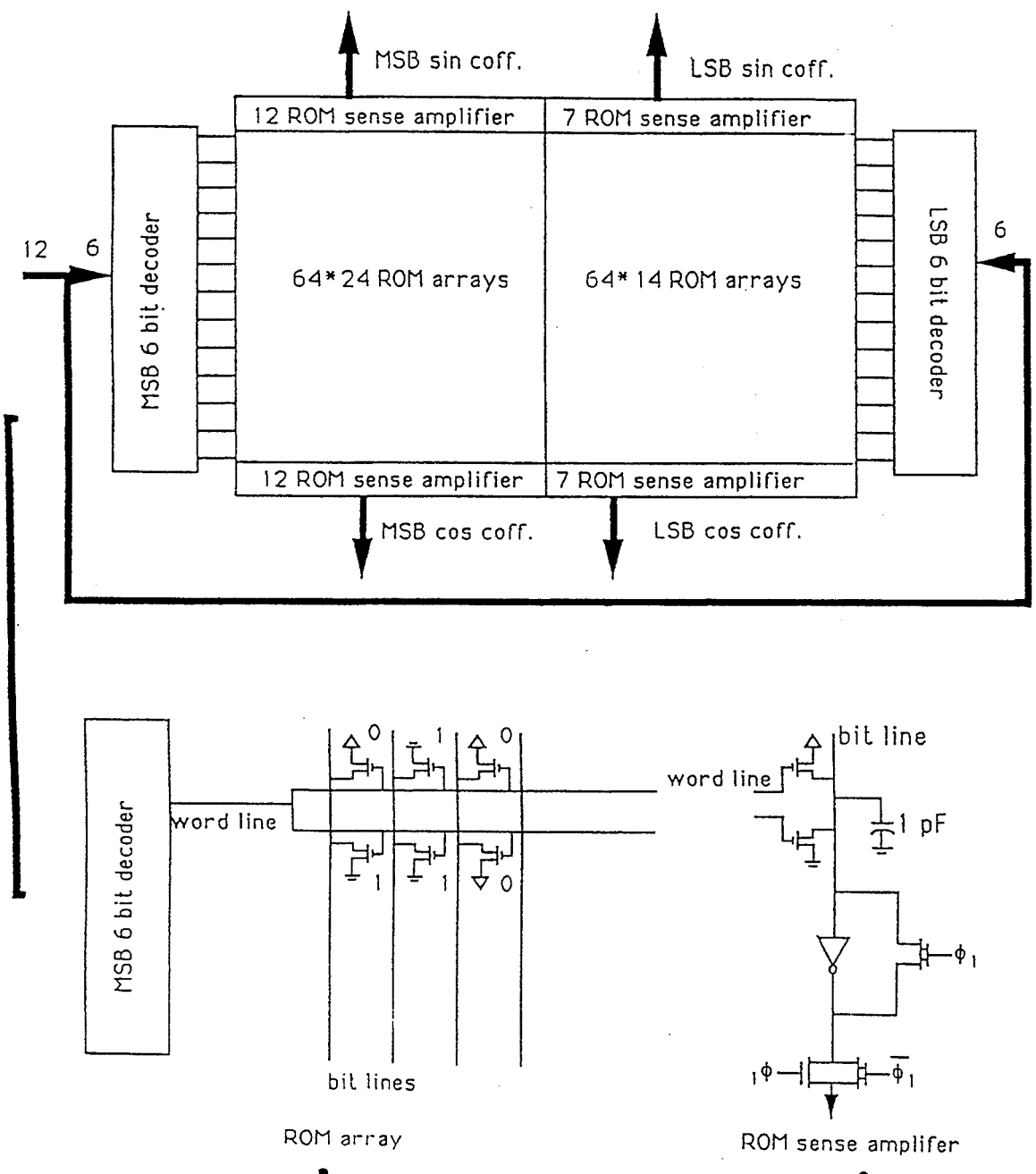

The main component of the distributed-arithmetic based lattice structure is ROMs 10 and 20. Most existing ROMs are implemented based on a precharge concept, that is, the bit lines are precharged high during a precharge phase, and then selected word lines discharge some of the bit lines according to coefficients stored during an evaluation phase. In order to reduce ROM access time, a specific ROM design is used. FIG. 3b shows the detail of each cell in the ROM. An invertor with a feedback transistor and a transmission gate controlled by phase $\rho_1$ is used as a sense amplifier at the output of the bit-lines. The bit lines are precharged to an intermediate voltage between ground (GND) and a predetermined voltage (Vdd). N-channel transistors are used to either charge bit line from this intermediate voltage to Vdd-Vt or discharge it to GND, during the evaluation phase. In this scheme, the array is fully populated, whereby the number of n-channel transistors in the array is MN, where M is the number of word lines and N is the number of bit lines. A 'zero' is stored at a particular location, by connecting the n-channel transistor at that location to Vdd; a 'one' is stored by connecting the transistor to GND. The cell size is only $13\lambda \times 16\lambda$.

In the distributed-arithmetic scheme, multiplication of a 12-bit input number with a 12-bit sine or cosine coefficient is performed by two ROMs 10 and 20, each with 6-bit inputs and two adders. This reduces chip area needed to implement multiplication with fixed coefficients. The ROM includes two 6-bit decoders and two small ROMs. This 12-bit input is divided into two parts; the most significant 6-bits of the input are used to generate the coefficients for small ROM1 and the least significant 6-bits are used for small ROM2. The final result of the multiplication is obtained by adding the outputs of small ROM1 with a shifted version of the outputs of small ROM2.

Only the most significant 7-bit result of the multiplication is stored in ROM2. The sizes of small ROM1 and ROM2 are 64 words by 24 bits and 64 words by 14 bits, respectively.

Figure 3C:
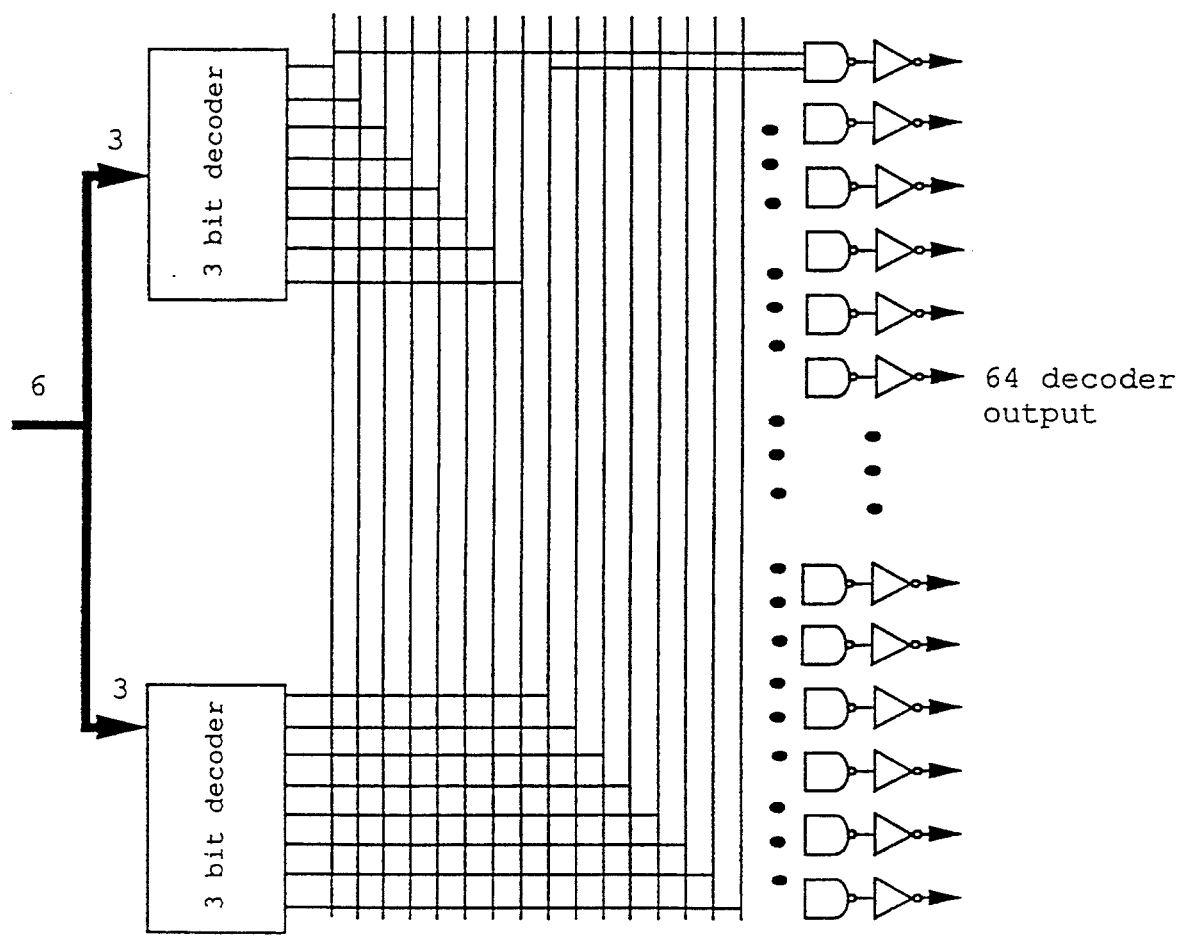

In order to improve ROM access time, each 6-bit decoder is implemented as a tree consisting of two 3-bit decoders and a linear array of 64 AND gates. The delay time for this 6-bit decoder is 8.55 ns, while a straightforward implementation would have a delay of 20.40 ns. The outputs of the 64 AND gates form the word lines of the ROM array. The logical layout of the 6-bit decoder is shown in FIG. 3c. The physical size of the final ROM is $1292\lambda \times 1646\lambda$ which is much smaller than the area need by a general purpose multiplier. The total ROM access time is 20 ns.

Adders

Since lattice modules are implemented based on a word-serial bit-parallel approach, high-speed bit-parallel adders are necessary. A 12-bit carry lookahead adder was built using three 4-bit carry lookahead adders. Two large invertors are placed at the outputs of the adders to supply sufficient drive capability. The physical size of the 12-bit adder is $1022\lambda \times 256\lambda$ and has a propagation delay of 18 ns.

Shift Registers and Latches

Figure 3D:
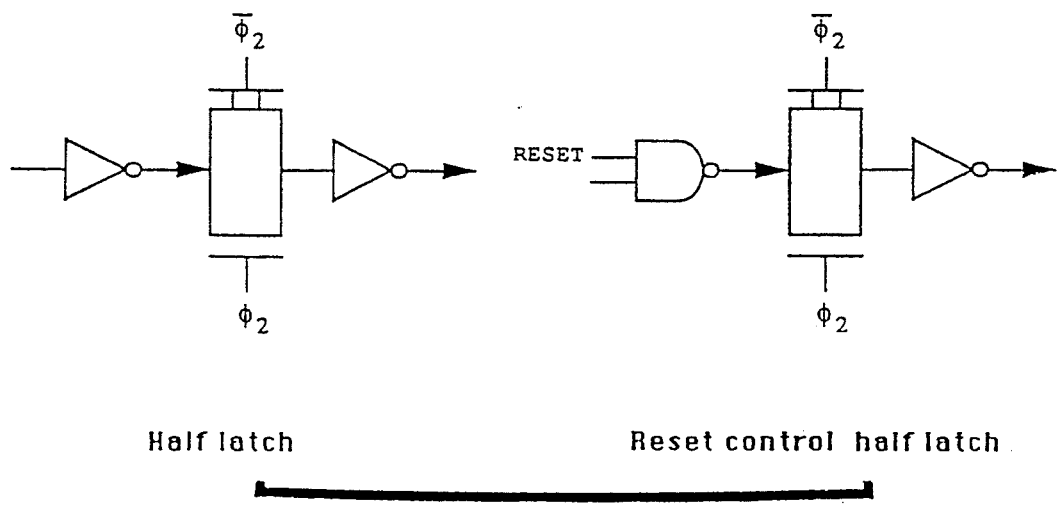

There are two kinds of latches 50 and one shift register 40 in the circuit. One of the latches is the half-latch which is controlled by phase $\Phi_2$ and is used to store intermediate results obtained from the adders. The logical representation of the 12-bit half-latch is depicted in FIG. 3c. The other latch is the reset controlled half-latch located in the feedback loop. Its logical circuit is shown in FIG. 3d. When a reset signal goes low, outputs from ROM2 and ROM3 are set to zero. The shift register located at the input stage of the system is a regular two phase shift register which delays the input sequence by eight clock cycles.

Control Unit

Figure 3E:
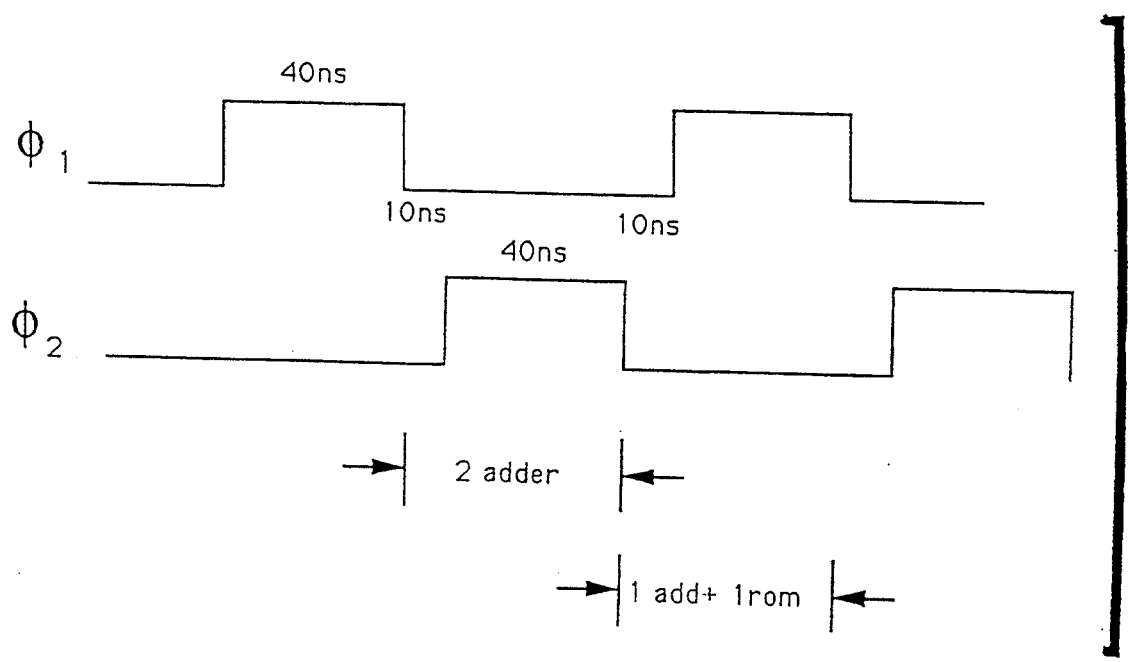

One reset control signal and two clock phases $\Phi_1$ and $\Phi_2$ are required in this system. Phase $\Phi_1$ is used to latch the computational results from one adder and the ROM, while phase $\Phi_2$ is used to latch results from the remaining adders. Since propagation delay times for the ROM and adder are approximately the same, we may make both clock phases as depicted in FIG. 3e. The reset signal is active low. One of the attractive features of this chip is the very simple control signals used. No additional logical control circuitry is needed in the design,

Chip Realization and Simulations

Figure 3F:
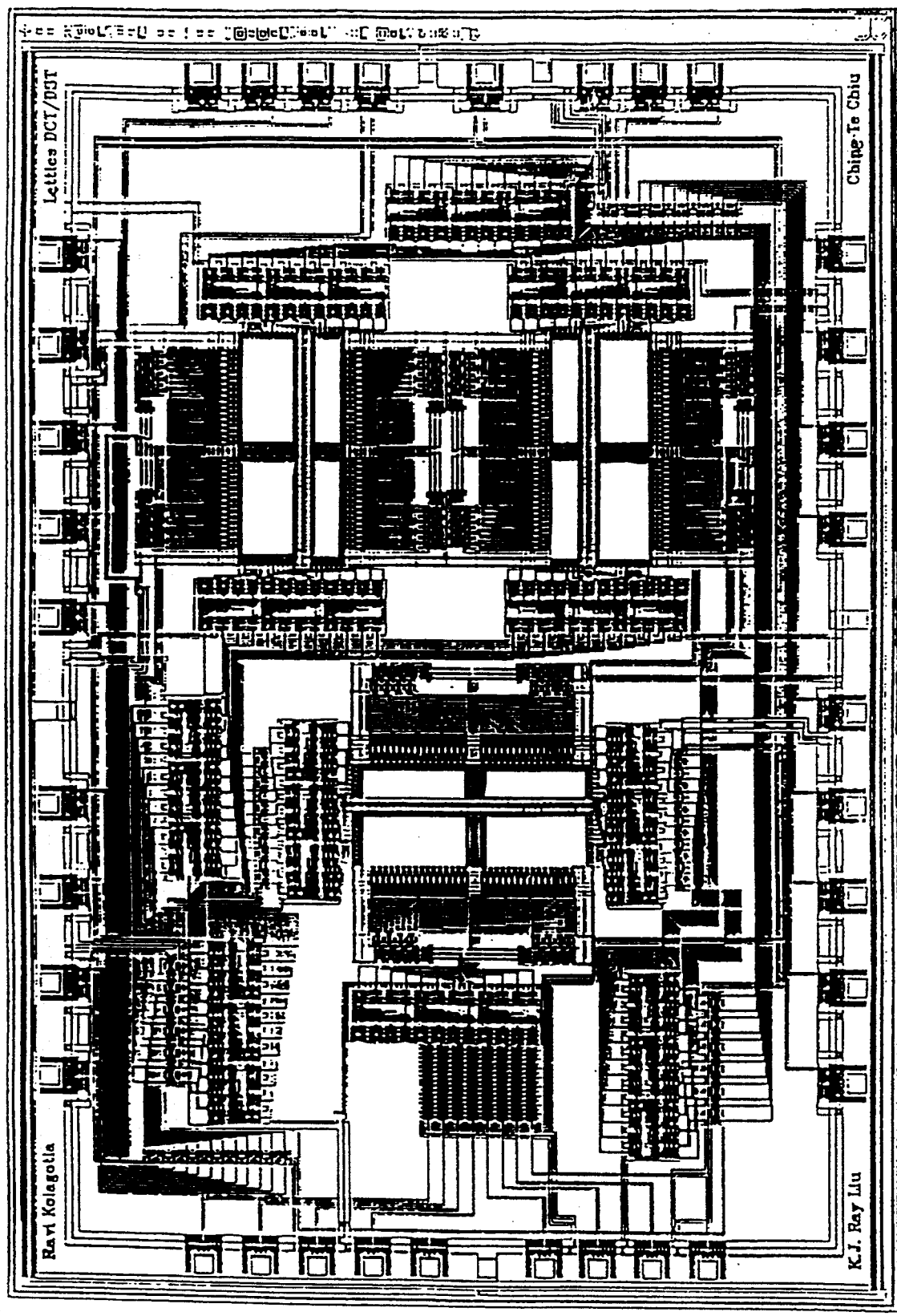

Having realized the symbolic layout of the individual blocks, the next issue is to integrate all of these components efficiently. This includes three ROMs, eleven adders, four half-latches, two reset controlled half-latches and one shift register. ROM2 and ROM3 are rotated by 90 and 270 degrees respectively to simplify inter-component routing. The chip accepts 8-bit input signals and produces 12-bit DCT and DST coefficients every 100 ns. The physical layout of the lattice module chip is depicted in FIG. 3f. There are 18000 transistors in the chip, most of which are used in the three fully-populated ROMs. The total size of the active circuitry is $5400\lambda \times 3400\lambda$. This is fabricated in a die of size $6800\lambda \times 4600\lambda$ and packaged in a 40-pin chip.

Figure 4:
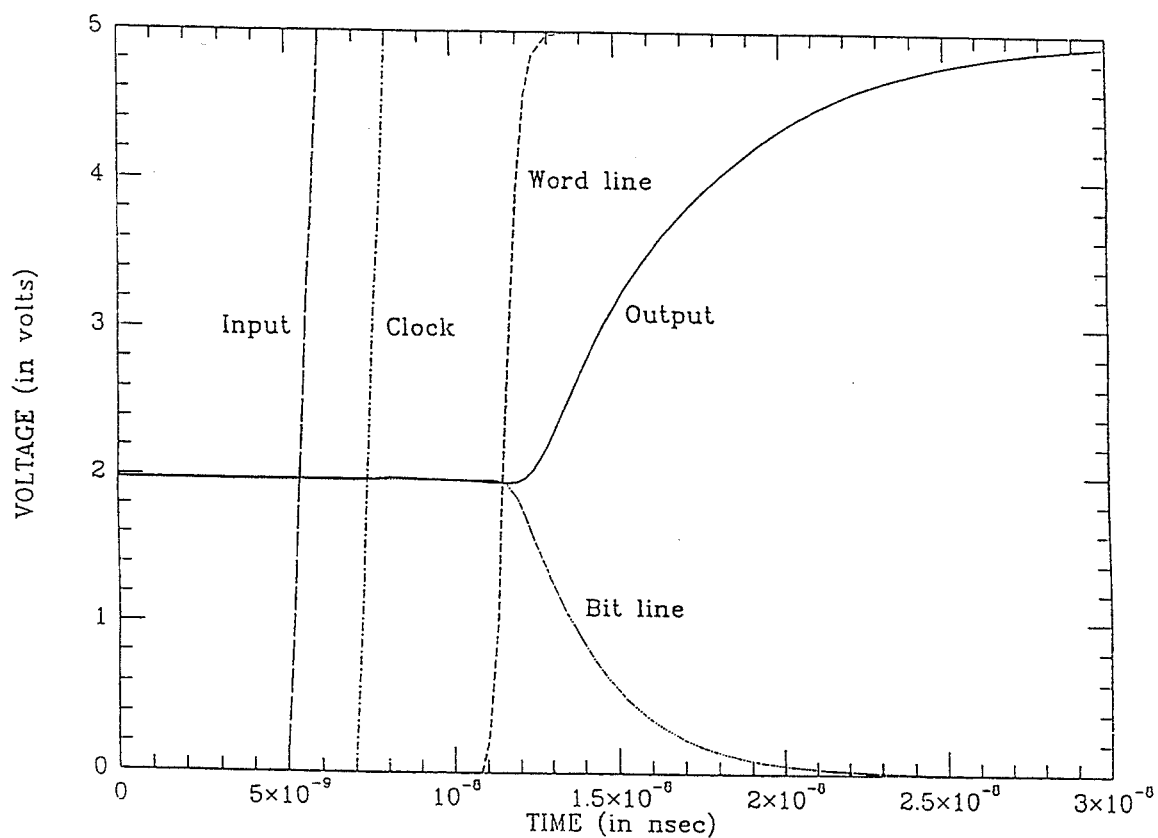
FIG. 4 is a graph of voltages v. time which illustrates ROM performance.

Both logical and timing simulations were performed on this chip. From the simulation results, the word length of the ROM must be at least 9 bits to ensure that the signal to noise ratio (SNR) is greater than 40 Db. To reduce errors due to recursive computations, the word length of the ROM is increased to 12 bits. IRSIM is used to perform logic simulations on the layout of the chip. The results from IRSIM were compared with the DCT and DST of the same input sequence obtained from a C program written on a SUN workstation. The results are accurate up to the least significant bit of the 12-bit representation. The SNR of this computation, from simulations, is about 41 dB, which is satisfactory for image an video processing applications. SPICE simulations indicate that the worst case rise and fall time for the ROM bit-lines are 8 ns and 9 ns respectively. FIG. 4 shows the timing simulation for the entire ROM which includes the decoder, cell array, and sense amplifier.

Results

The algorithm and architecture were successfully implemented in the first chip that may generate the 1-D DCT and DSCT simultaneously. The implementation of the lattice module used a distributive arithmetic method with a data rate of 116 Mb/s under 2 μm CMOS technology. Fabricating using Φ.8 μm technology will result in a data rate of 320 Mb/s. These results clearly show that VLSI implementation of the present invention is very practical and functional for real-time image processing. Further, Table 2, located below shows a comparison of the Liu-Chiu1 and Lui-Chui2 SIPO and SISO architectures to well known prior hardware implementations of "fast" algorithms. The Lui-Chiu1 and Lui-Chui2 are simply the FIG. 3a implementation with SIPO and SISO I/O configurations. The present invention architecture using time-recursive algorithms provides a substantial increased in flexibility and integration.

TABLE 1

| Technology | 2-μm double metal CMOS |
|---|---|
| Core size | 5.6 × 3.4 mm² |
| Die size | 6.8 × 4.6 mm² |
| Total no. of transistors | 18,000 |
| Active signal pads | 39 |
| Speed | 14.5 MHz |

TABLE 2

|  | Liu-Chiu1 | Liu-Chiu2 | Chen et al. | Lee | Hou |
|---|---|---|---|---|---|
| No. of Multipliers | 6N − 4 | 4N | Mn(N) −3N/2 + 4 | (N/2)ln(N) | N − 1 |
| latency | N | 2N | N/2 | [ln(N)(ln(N) − 1)]/2 | 3N/2(order) |
| limitation on transform size N | no | no | power of 2 | power of 2 | power of 2 |
| communication | local | local | global | global | global |
| I/O operation | SIPO | SISO | PIPO | PIPO | SIPO |

Lattice Structure for Discrete Sinusoidal Transforms

The time-recursive approach has been shown to be effective in both hardware and computational complexity for the computation of discrete sinusoidal transforms (DXT) of time series input data streams. This approach will be extended to problems of computing the discrete fourier transform (DFT), lapped orthogonal transform (LOT), and the complex lapped orthogonal transform (CLT). Further, a unified view of lattice structures for time recursive approach will be disclosed.

Figure 1B:
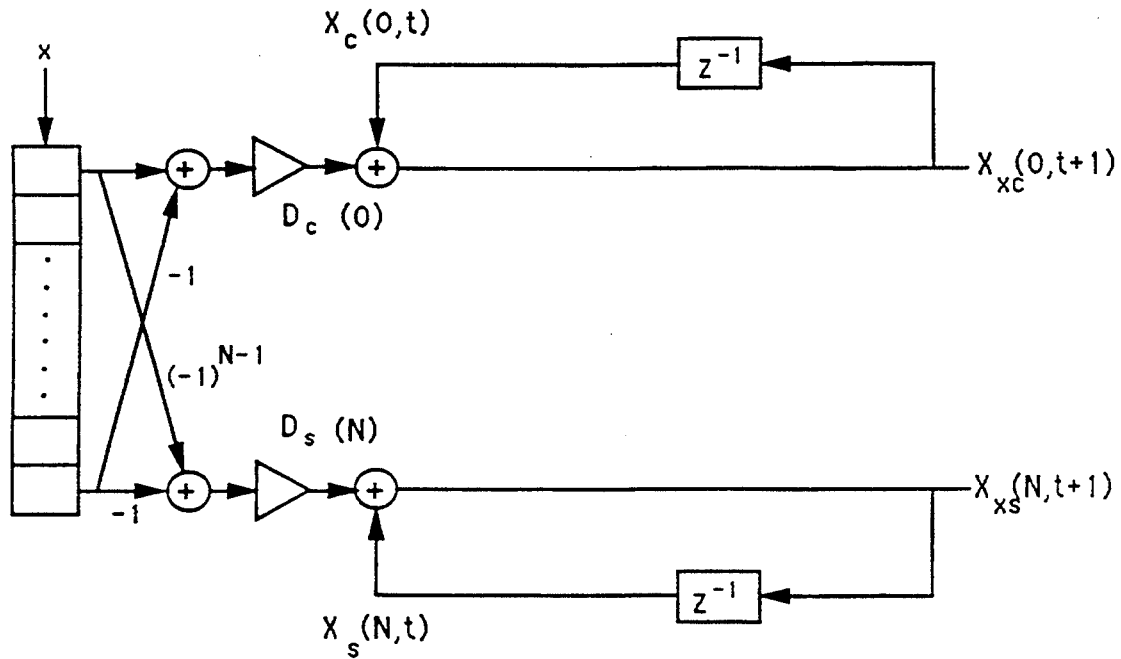

The discrete sinusoidal transform DXT of a data sequence of length N at time t is denoted as:

$$X(k,t) = C(k) \sum_{n=t}^{t+N-1} x(n)P_{n-t}(k) = 0, 1, \ldots, N - 1,$$

where $P_{n-t}(k)$ are transform basis functions and $C(k)$ are constants used for normalization. Most discrete sinusoidal transforms have dual generated pairs. The lattice structure used for generating one transform automatically generates its dual. For example the dual discrete cosine transform (DCT) is the discrete sine transform (DST). Both the transform and its dual have similar updating relations. The dual generated pairs are denoted by $X_{xc}(k,t)$ and $X_{xs}(k,t)$. The time recursive relation between $X_x(k,t)$ and $X_x(k,t+1)$ may be obtained by eliminating the effect of the first term of the previous sequence and updating the effect of the last term of the current sequence. The dual generating properties between transform pairs $X_{xc}(k,t)$ and $X_{xs}(k,t)$ are given by:

$$X(k,t) = C(k) \sum_{n=t}^{t+N-1} x(n)P_{n-t}(k), k = 0, 1, \ldots, N - 1,$$

and $$X_{xc}(k,t + 1) = e(k) \{[X_{xc}(k,t) + [x(t + N)(-1)^k - x(t)]D_c]T_c + [X_{xs}(k,t) + [x(t + N)(-1)^k - x(t)]D_s]T_s\}$$

where $D_c$ and $D_s$ are the associated cosine and sine transform kernels of the DXT with fixed index n. Coefficients $e(k)$ and $f(k)$ depend on the definition of the transforms and are always equal to one except for the two transforms LOT and CLT. That is, two transforms may be usually generated from each other in a lattice form as shown in FIGS. 1a and 1b. The definition of the various discrete sinusoidal transforms and state the equations will be described below.

The one-dimensional(1-D) DCT of an input data sequence is defined as:

$$X_c(k,t) = C(k)\sqrt{\frac{2}{N}} \sum_{n=t}^{t+N-1} x(n)\cos\left[\left(n - t + \frac{1}{2}\right)\frac{k\pi}{N}\right],$$

$$k = 0, 1, \ldots, N - 1,$$

and the 1-D DST is defined as:

$$X_s(k,t) = C(k)\sqrt{\frac{2}{N}} \sum_{n=t}^{t+N-1} x(n)\sin\left[\left(n - t + \frac{1}{2}\right)\frac{k\pi}{smN}\right],$$

-continued $$k = 1, \ldots, N,$$

The updated DCT and DST of the input data may be generated from $X_c(k,t)$ and $X_s(k,t)$ by the following relations:

$$X_c(k, t+1) = C(k)\sqrt{\frac{2}{N}} \sum_{n=t+1}^{t+N} x(n) \cos\left[\frac{\pi[2(n-t-1)+1]k}{2N}\right],$$

$$= \left\{ X_c(k,t) + [-x(t) + (-1)^k x(t+N)]C(k)\left(\sqrt{\frac{2}{N}}\right)\cos\left(\frac{\pi k}{2N}\right)\right\}\cos\left(\frac{\pi k}{N}\right) +$$

$$\left\{ X_s(k,t) + [-x(t) + (-1)^k x(t+N)]C(k)\left(\sqrt{\frac{2}{N}}\right)\sin\left(\frac{\pi k}{2N}\right)\right\}\sin\left(\frac{\pi k}{N}\right)$$

and $$X_s(k, t+1) = \left\{ X_s(k,t) + [-x(t) + (-1)^k x(t+N)]C(k)\left(\sqrt{\frac{2}{N}}\right)\sin\left(\frac{\pi k}{2N}\right)\right\}\cos\left(\frac{\pi k}{N}\right) -$$

$$\left\{ X_c(k,t) + [-x(t) + (-1)^k x(t+N)]C(k)\left(\sqrt{\frac{2}{N}}\right)\cos\left(\frac{\pi k}{2N}\right)\right\}\sin\left(\frac{\pi k}{N}\right)$$

That is, the DCT and DST may be dually generated time-recursively in a lattice form.

The definition of Discrete Hartley Transform (DHT) is given by:

$$X_H(k,t) = \frac{1}{\sqrt{N}} \sum_{n=t}^{t+N-1} x(n) \cos\left(2(n-t)\frac{\pi k}{N}\right)$$

$$k = 0, 1, \ldots, N-1,$$

The Discrete Fourier Transform (DFT) of N samples is defined as:

$$X_f(k,t) = \frac{1}{\sqrt{N}} \sum_{n=t}^{t+N-1} x(n) \exp\left(-j2(n-t)\frac{\pi k}{N}\right),$$

$$k = 0, 1, \ldots, N-1.$$

The DHT uses real expressions $$\cos\left(\frac{2\pi k(n-t)}{N}\right) + \sin\left(\frac{2\pi k(n-t)}{N}\right)$$

as the transform kernel, while DFT uses the complex exponential expression $$\exp\left(\frac{j2\pi k(n-t)}{N}\right)$$

as the transform kernel. Since the kernel of the DHT is a summation of cosine and sine terms, the kernel may be separated into a combination of a DCT-like and a DST-like transforms as follows:

$$X_H(k,t) = \dot{X}_c(k,t) + \dot{X}_s(k,t),$$

where $$\dot{X}_c(k,t) = \frac{1}{\sqrt{N}} \sum_{n=t}^{t+N-1} x(n) \left[\cos\left(\frac{2\pi k(n-t)}{N}\right)\right],$$

and $$\dot{X}_s(k,t) = \frac{1}{\sqrt{N}} \sum_{n=t}^{t+N-1} x(n) \left[\sin\left(\frac{2\pi k(n-t)}{N}\right)\right].$$

The $X'_c(k,t)$ is the DCT-I and the $X'_s(k,t)$ is the DST-I. The $X'_c(k,t)$ and $X'_s(k,t)$ may be dually generated from each other with the corresponding coefficients listed in Table 3 located below. Therefore, the DCT-I and DST-I are dual pairs. From the lattice structure shown in FIG. 1, the DHTs are obtained by adding the dual pairs $X'_c(k,t)$ and $X'_s(k,t)$. The real part of the DFT is $X'_c(k,t)$ and the imaginary part is $X'_s(k,t)$.

TABLE 3

| | $T_c$ | $T_s$ | $D_c$ | $D_s$ | e(k) | f(k) |
|---|---|---|---|---|---|---|
| DCT/DST | $\cos(\pi k/N)$ | $\sin(\pi k/N)$ | $C(k)\sqrt{\frac{2}{N}}\cos(\pi k/2N)$ | $C(k)\sqrt{\frac{2}{N}}\sin(\pi k/2N)$ | 1 | 1 |
| DHT/DFT | $\cos(2\pi k/N)$ | $\sin(2\pi k/N)$ | $\sqrt{\frac{1}{N}}$ | 0 | 1 | 1 |

TABLE 3-continued

| | $T_c$ | $T_s$ | $D_c$ | $D_s$ | e(k) | f(k) |
|---|---|---|---|---|---|---|
| LOT/CLT | $\cos(\pi/2N)$ | $\sin(\pi/2N)$ | $\sqrt{\frac{1}{N}}\,(-1)^k j \cdot \exp{-j\theta_k}\,\sin(\pi/4N)$ | $\sqrt{\frac{1}{N}}\,(-1)^k j \cdot \exp{-j\theta_k}\,\sin(\pi/4N)$ | $\exp j2\theta_k$ | $\exp j2\theta_k$ |

The Complex Lapped Transform (CLT) of 2N samples is defined as:

$$X_{ch}(k,t) = \frac{1}{\sqrt{N}} \sum_{n=t-N-\frac{1}{2}}^{t+\left(N-\frac{1}{2}\right)} x(n)\exp\left\{-j\frac{(2k+1)(n-t)\pi}{2N}\right\}\cos\frac{(n-t)\pi}{2N},$$

$k = 0, 1, \ldots, N-1,$

The Lapped Orthogonal Transform (LOT) of 2N samples is defined as:

$$X_{lot}(k,t) = \begin{cases} \sqrt{\frac{2}{N}} \sum_{n=t-\left(N-\frac{1}{2}\right)}^{t+\left(N-\frac{1}{2}\right)} x(n)\cos\frac{(2k+1)(n-t)\pi}{2N}\cos\frac{(n-t)\pi}{2N} + \alpha_k, \\ \qquad k = 0, 2, \ldots, (N-2), \text{ even part of the CLT} \\ \sqrt{\frac{2}{N}} \sum_{n=t-\left(N-\frac{1}{2}\right)}^{t+\left(N-\frac{1}{2}\right)} x(n)\cos\frac{(2k+1)(n-t)\pi}{2N}\cos\frac{(n-t)\pi}{2N} + \beta_{nk}, \\ \qquad k = 1, 3, \ldots, (N-1), \text{ odd part of the CLT} \end{cases}$$

Since the LOT is obtained from the even and odd value of k, we focus on the dual generation for the CLT only. An Auxiliary Complex Transform (ACLT) of 2N samples may be defined as:

$$X_{clt}(k,t) = \frac{1}{\sqrt{N}} \sum_{n=t-\left(N-\frac{1}{2}\right)}^{t+\left(N-\frac{1}{2}\right)} x(n)\exp\left\{-j\frac{(2k+1)(n-t)\pi}{2N}\right\}\sin\frac{(n-t)\pi}{2N},$$

$k = 0, 1, \ldots, N-1.$

Then, the CLT and ACLT may be dually generated with the corresponding coefficients listed in table 3 above. All the transforms mentioned above may be realized by a lattice structure as shown in FIG. 1. Table 3 lists the coefficients in the unified lattice structure for different transforms.

Optimal Time Recursive Architectures

Transfer Function Approach

Input data arrive serially in most real-time signal processing applications. If we view the transform operation as a linear shift invariant (LSI) system which transforms input sequences of samples into their transform coefficients then the transform operation is similar to a filtering operation. The general approach to tackle a digital filter problem is to look at its transfer function.

The transfer functions of the DXT may be derived using several approaches. We will derive them from the unified time-recursive lattice structure as shown in FIG. 1. The time difference equations, where the time index t is an integer parameter, for the dually generated pairs are:

$$Y_{xc,k}(t) = e(k)\{T_c[D_c\tilde{x}(t) + Y_{xc,k}(t-1)] + T_s[D_s x(t) + Y_{xs,k}(t-1)]\}$$

and $$Y_{xs,k}(t) = f(k)\{T_c[D_c\tilde{x}(t) + Y_{xs,k}(t-1)] + T_s[D_s\tilde{x}(t) + Y_{xc,k}(t-1)]\}$$

where $$\tilde{x}(t) = (-1)^k x(t+N) - x(t),$$

and $y_{xc,k}(t)$ and $y_{xs,k}(t)$ corresponds to $X_{xc}(k,t)$ and $X_{xs}(k,t)$. The z transform deduced form the above difference equations are:

$$Y_{xc,k}(z) = e(k)\{(D_c T_c + D_s T_s)\tilde{X}(z) + T_c Y_{xc,k}(z)z^{-1} + T_s Y_{xs,k}(z)z^{-1}\}$$

and $$Y_{xs,k}(z) = f(k)\{(D_sT_c + D_cT_s)\tilde{X}(z) + T_cY_{xs,k}(z)z^{-1} + T_sY_{xc,k}(z)z^{-1}\}$$

$Y_{xs,k}(z)$ can be expressed in terms of $Y_{xc,k}(z)$ and $X'(z)$ as:

$$Y_{xs,k}(z) = \frac{f(k)\{(D_sT_c - D_cT_s)\tilde{X}(z) - T_sY_{xc,k}(z)z^{-1}\}}{1 - f(k)T_cz^{-1}},$$

it follows that the transfer function for $Y_{c,k}(z)/X(z)$ as:

$$H_{xc,k}(z) = \frac{((-1)^k z^{-N})(e(k)[D_cT_cD_sT_s] - e(k)f(k)D_cz^{-1})}{1 - (e(k) + f(k))T_cz^{-1} + e(k)f(k)z^{-2}}.$$

Similarly, the transfer function for $Y_{s,k}(z)/X(z)$ is given by:

$$H_{xs,k}(z) = \frac{((-1)^k z^{-N})(f(k)[D_sT_cD_cT_s] - e(k)f(k)D_sz^{-1})}{1 - (e(k) + f(k))T_cz^{-1} + e(k)f(k)z^{-2}}.$$

From Table 3 and the transfer functions derived above, the transfer functions of different discrete sinusoidal transforms are given by:

$$H_c(z) = \sqrt{\frac{2}{N}} C(k) ((-1)^k -$$

$$z^{-N})\left(\cos\frac{\pi k}{2N}\right)\frac{(1 - z^{-1})}{\left(1 - 2\left(\cos\frac{\pi k}{N}\right)z^{-1} + z^{-2}\right)},$$

$$H_s(z) = \sqrt{\frac{2}{N}} C(k) ((-1)^k -$$

$$z^{-N})\left(\sin\frac{\pi k}{2N}\right)\frac{(1 - z^{-1})}{\left(1 - 2\left(\cos\frac{\pi k}{N}\right)z^{-1} + z^{-2}\right)},$$

$$H_h(z) = \frac{1}{\sqrt{N}} (1 - z^{-N})\left(\frac{\cos\frac{2\pi k}{N} - \sin\frac{2\pi k}{N} - z^{-1}}{1 - 2\left(\cos\frac{2\pi k}{N}\right)z^{-1}z^{-2}}\right),$$

$$H_f(z) = \frac{1}{\sqrt{N}} (1 - z^{-N})\left(\frac{\cos\frac{2\pi k}{N} + j\sin\frac{2\pi k}{N} - z^{-1}}{1 - 2\left(\cos\frac{2\pi k}{N}\right)z^{-1}z^{-2}}\right).$$

Since the size of the input data is 2N in the CLT, the updated vector is $1 - z^{2N}$ instead of $1 - z^N$. The transfer function is obtained by substituting the corresponding coefficients in tables 3 through 6 resulting in:

$$H_{clt}(z) =$$

$$(1 - z^{-2N})\frac{1}{\sqrt{N}}j(-1)^{k+1}\frac{\left(\sin\frac{\pi}{4N}\right)e^{j\theta}(1 + e^{2\theta}z^{-1})}{1 - e^{j2\theta}2\left(\cos\frac{\pi}{2N}\right)z^{-1} + e^{j4\theta}z^{-2}},$$

$$\theta = \frac{(2K + 1)\pi}{4N}$$

Therefore, it follows that for the LOT, $H_{lote}(z)$ = even part of $\{H_{clt}\}$ $H_{loto}(z)$ = odd part of $\{H_{clt}\}$ It is known that the transfer function of these transforms are of finite impulse response. Hence, the poles in the denominator will be canceled by the zeros of $((-1)^k - z^{-N})$ in the nominator. It is observed that when the updating vector $(1 - z^{-N})$ is factored out, the basic structure of all the transforms are composed of a FIR and an IIR filter with a second order denominator and a first order numerator, therefore we are using an IIR filter to realize a FIR filter. This realization may greatly reduce hardware complexity compared with the implementation consisting of FIR structures.

The Unified IIR Filter Architectures

Figure 2:
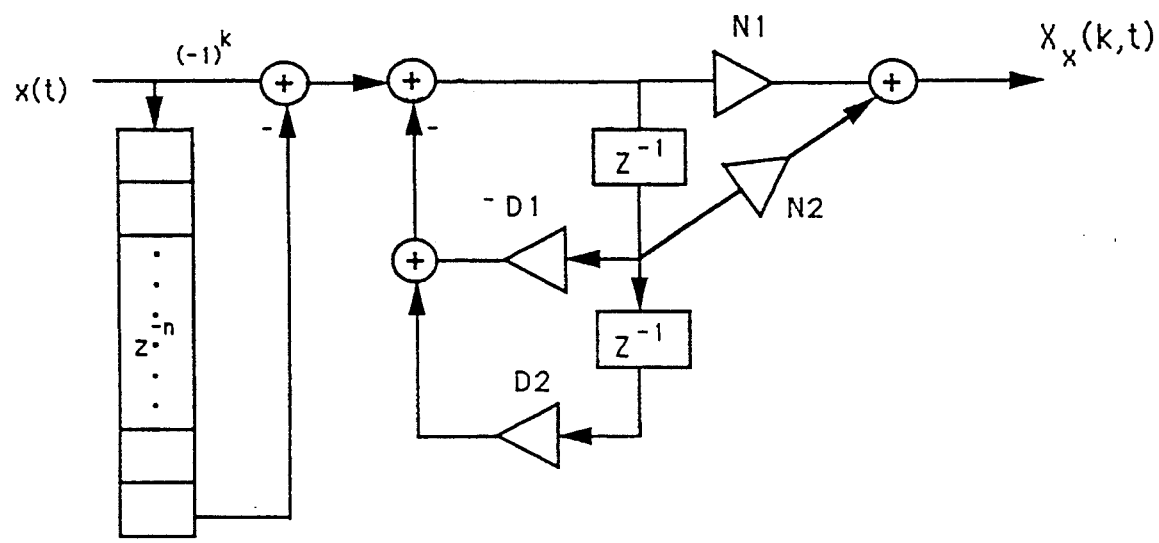
FIG. 2 is a block diagram showing a universal IIR filter module constructed in accordance with an alternate embodiment of the invention.

From the transfer functions derived above, it may be observed that the DXT may be realized using a single universal filter module consisting of a shift register array and a second order IIR filter. This structure is depicted in FIG. 2. The coefficients of the universal IIR module for different transforms are listed in Table 4, below.

TABLE 4

| | k | n | D1 | D2 | N1 | N2 |
|---|---|---|---|---|---|---|
| DCT | k | N | $2\cos(\pi k/N)$ | 1 | $C(k)\sqrt{\frac{2}{N}}\cos(\pi k/2N)$ | $-C(k)\sqrt{\frac{2}{N}}\cos(\pi k/2N)$ |
| DST | k | N | $2\cos(\pi k/N)$ | 1 | $-C(k)\sqrt{\frac{2}{N}}\sin(\pi k/2N)$ | $-C(k)\sqrt{\frac{2}{N}}\sin(\pi k/2N)$ |
| DHT | 0 | N | $2\cos(2\pi k/N)$ | 1 | $\sqrt{\frac{1}{N}}[\cos(2\pi k/N) - \sin(2\pi k/N)]$ | $\sqrt{\frac{1}{N}}$ |

TABLE 4-continued

| | k | n | D1 | D2 | N1 | N2 |
|---|---|---|---|---|---|---|
| DFT | 0 | N | $2\cos(2\pi k/N)$ | 1 | $\sqrt{\frac{1}{N}}[\cos(2\pi k/N) + j\sin(2\pi k/N)]$ | $\sqrt{\frac{1}{N}}$ |
| CLT | 0 | 2N | $\exp j2\theta_k$ $2\cos(\pi/2N)$ | $\exp j4\theta_k$ | $\sin(\pi/4N)^2 \exp j\theta_k$ | $(-1)^k \sin(\pi/4N) \cos(\pi/4N) \exp j4\theta_k$ |

Figure 16:
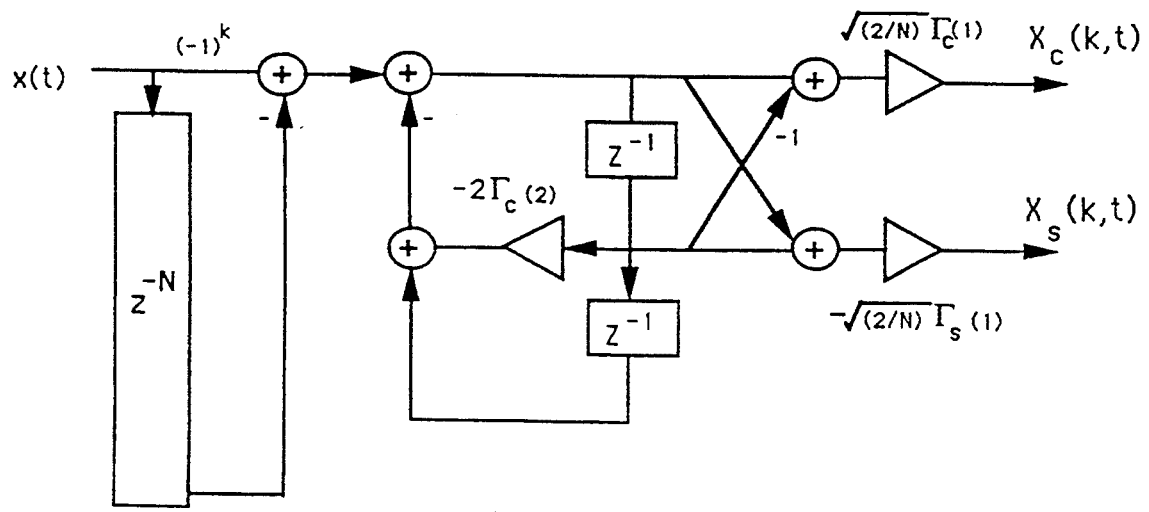
FIG. 16 is a block diagram of an IIR filter structure for DCT and DST transforms.
Figure 17:
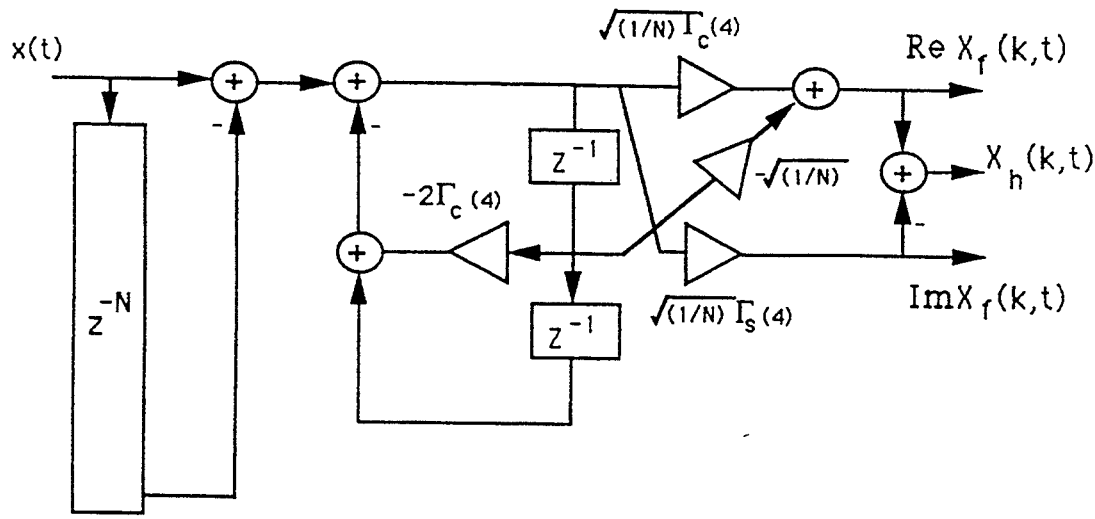
FIG. 17 is a block diagram of an IIR filter structure for a DHT and DFT transforms.

It should be noted that the DCT and the DST share the same denominator and may be simultaneously generated using an IIR filter structure with three multipliers as depicted in FIG. 16. Compared with the lattice structure for the DCT and DST, the IIR realization requires only half as many multipliers. The difference is that the IIR structure implements the denominator of the transfer function in a direct form, while the lattice structure implements the poles in a normal form. It may also be observed that a single unified filter structure may be used to generate both the DHT and the DFT. This structure is depicted in FIG. 17.

Figure 18:
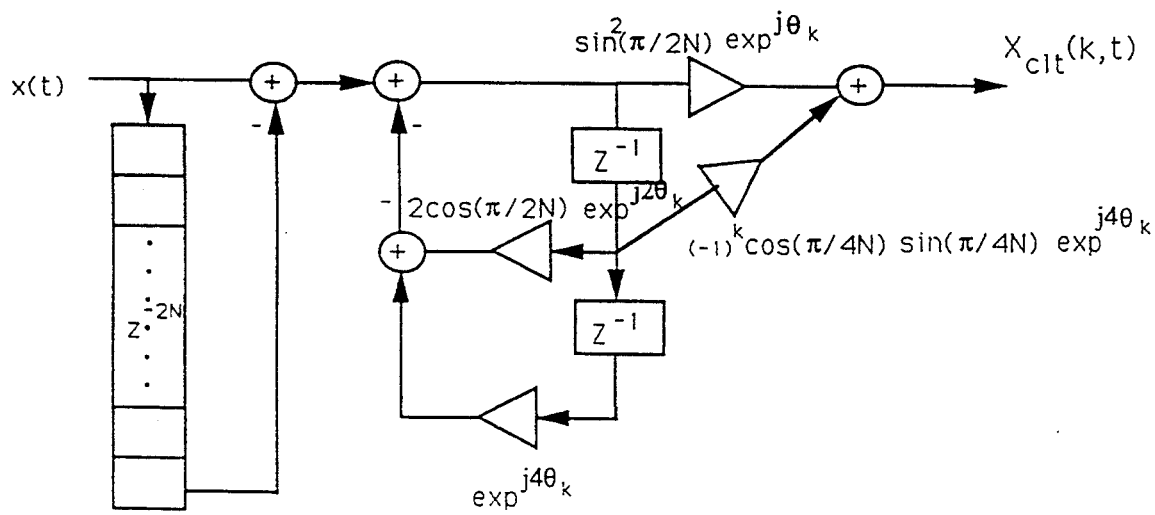
FIG. 18 is a block diagram of an IIR filter structure for LOT and LCT transforms.

The IIR filter architecture for the LOT and CLT is shown in FIG. 18. In the following it is shown how to realize the CLT using real operations. The definition of the CLT may be rewritten as:

$$X_{cl}(k) = (-1)^k j \frac{1}{\sqrt{N}} \sum_{n=0}^{2N-1} x(n)\exp\left(-j\frac{(2k+1)(2n+1)\pi}{4N}\right)\sin\frac{(2n+1)\pi}{4N},$$

$k = 0, 1, \ldots, N - 1.$

If we define another transform with basis functions only length N, $$t_{nk} = \frac{1}{N}\exp\frac{j(2n+1)k\pi}{2N}$$
$$= \frac{1}{N}\{DCT_{nk} - j \cdot DST_{jk}\},$$

$n, k = 0, 1, \ldots, N - 1.$ then the CLT may be expressed in the form of:

$$X_{cl}(k) = \frac{1}{2}(-1)^k \sum_{n=0}^{N-1} x(n)[t_{nk} - T_{n(k+1)}] +$$

$$\frac{1}{2}(-1)^k \sum_{n=N}^{2N-1} x(n)[t_{nk} + t_{n(k+1)}],$$

Figure 19:
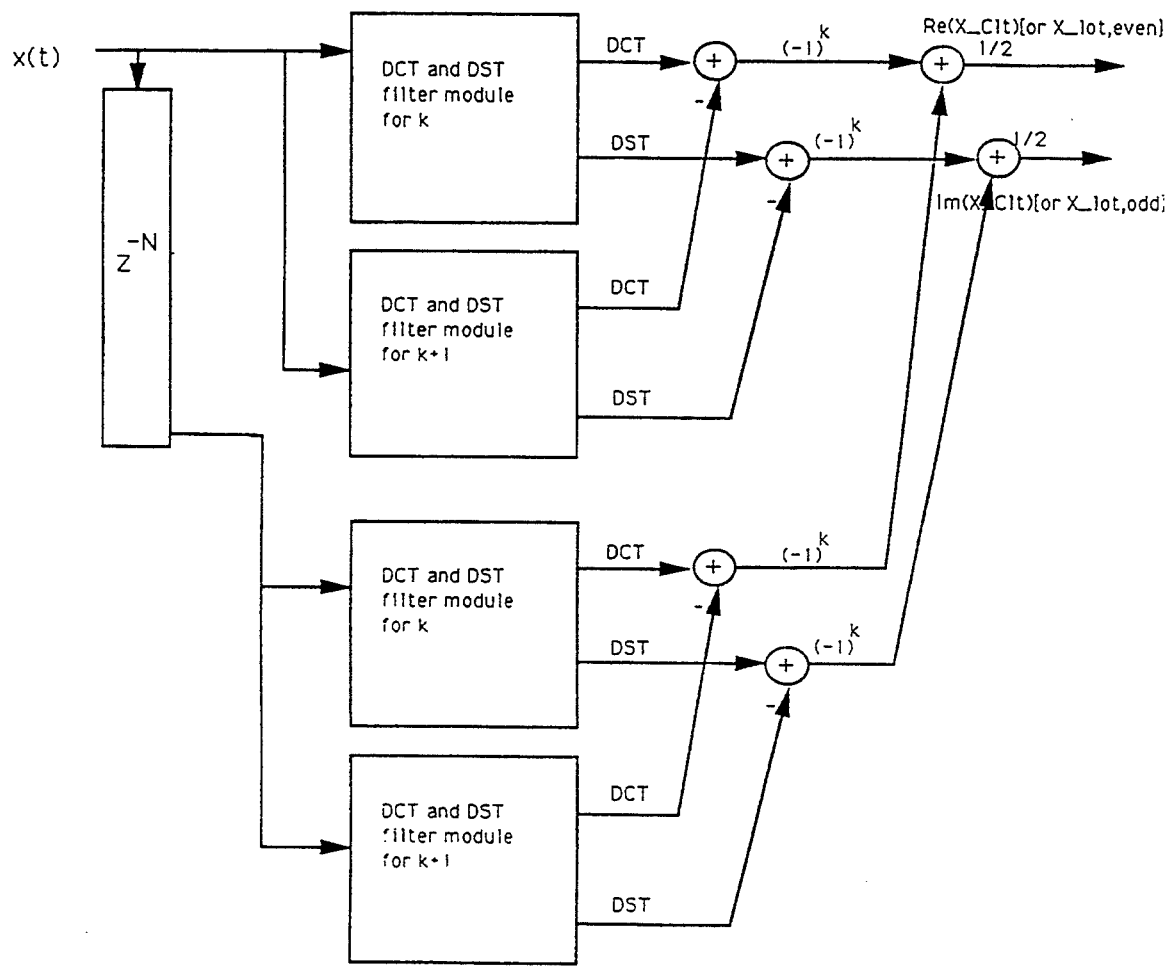
FIG. 19 is a block diagram of an IIR filter structure for real operation of LOT and CLT transforms.

This leads to the CLT architecture as shown in FIG. 19 in which the $t_{mm}$ are generated by using the DCT and DST dual generating circuit as depicted in FIG. 16. The number of multipliers and adders required for these IIR filter structures are summarized in Table 5, below.

TABLE 5

| TRANSFORMS | MULTIPLIERS | ADDERS |
|---|---|---|
| DCT | 2N − 2 | 3N + 2 |
| DST | 2N − 2 | 3N + 2 |
| DHT | 2N | 3N + 1 |
| DFT | 3N − 2 | 3N + 1 |
| LOT* | 4N | 4N |
| CLT* | 4N | 4N |
| DCT and DST | 3N − 3 | 4N + 2 |
| DHT and DFT | 3N − 2 | 4N + 1 |

Figure 15:
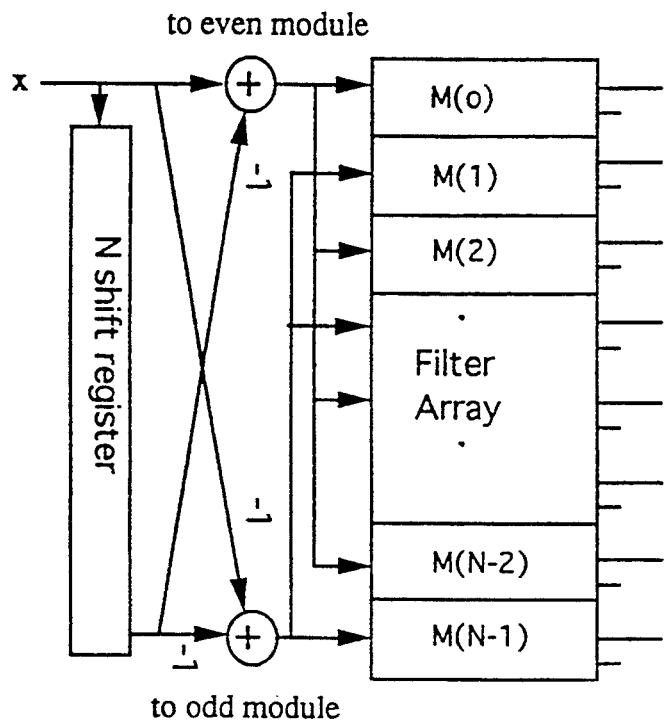
FIG. 15 is a block diagram of a parallel IIR filter structure for 1-D DXT transform.

The architecture to generate 1-D DXT is depicted in FIG. 15. This parallel structure consists of a shift register array of size N, two adders, and N IIR filter modules. Two sets of inputs $x(t+N)-x(t)$ and $-x(t+N)-x(t)$ are generated for the even and odd filter modules respectively. When a new datum $x(t)$ arrives, a new set of transform coefficients are obtained in O(1) time, therefore the throughput rate is O(1).

Architectures for Inverse Transforms

Inverse transforms are important in retrieving original information in digital communication systems. The inverse DHT and DFT are given by:

$n = 0, 1, \ldots, N - 1.$ $$x(n,t) = \frac{1}{\sqrt{N}} \sum_{k=t}^{t+N-1} X(k)\exp\left(j2\pi\frac{(k-t)}{N}\right),$$

$n = 0, 1, \ldots, N - 1.$

We observe that the transfer function of the inverse DHT(IDHT) is exactly the same as its forward transform. The transfer function of the inverse DFT(IDFT) is given by:

$$H(z) = \frac{1}{\sqrt{N}}(1 - z^{-N})\left(\frac{\cos\frac{2\pi k}{N} - j\sin\frac{2\pi k}{N} - z^{-1}}{1 - 2\cos\frac{2\pi k}{N}z^{-1} + z^{-2}}\right),$$

which is same as the DFT except that the imaginary part is negated. Therefore, the IDHT and IDFT may be realized by using the same architecture as those depicted in FIG. 17 except that an invertor is added at the output of the $\text{Im}X_f(k,t)$.

The inverse DCT and DST (IDCT and TDST) are defined as follows:

$$x_c(n,t) =$$

$$\sqrt{\frac{2}{N}} \sum_{k=t}^{t+N-1} C(k-t)X_c(k)\cos\left[\left(n+\frac{1}{2}\right)\frac{(k-t)\pi}{N}\right],$$

-continued
$$n = 0, 1, \ldots, N - 1.$$

$$x_s(n,t) = \sqrt{\frac{2}{N}} \sum_{k=t}^{t+N-1} C(k-t)X_s(k)\sin\left[\left(n + \frac{1}{2}\right)\frac{(k-t)\pi}{2N}\right].$$

$$n = 0, 1, \ldots, N - 1.$$

Because C(k) is inside the transform, the architectures require some modification. Since C(k)=1 except for k=0 or k=N, we can rewrite the expression as:

$$x_c(n,t) = \sqrt{\frac{2}{N}} \sum_{k=t}^{t+N-1} X(k)\cos\left[\left(n + \frac{1}{2}\right)\frac{(k-t)\pi}{N}\right] + \sqrt{\frac{2}{N}} \left(\sqrt{\frac{1}{2}} - 1\right)X(t).$$

It should be observed that the first part of the above equation is of the same form as that of DCT except for the leading constant coefficients C(k). Hence, the transfer function of the IDCT is that of the DCT plus one delay term specified as follows:

$$H_{ic}(z) = \sqrt{\frac{2}{N}} \left((-1)^k - z^{-N}\right)\cos\frac{\pi k}{2N} \frac{(1 - z^{-1})}{\left(1 - 2\cos\frac{\pi k}{N} z^{-1} + z^{-2}\right)} + \sqrt{\frac{2}{N}} \left(\sqrt{\frac{1}{2}} - 1\right)z^{-(N-1)}$$

This implies that the IDCT may be implemented by using the same architecture as the DCT and adding the compensated term $$\sqrt{\frac{2}{N}} \left[\sqrt{\frac{1}{2}} - 1\right]X(t).$$

Figure 20:
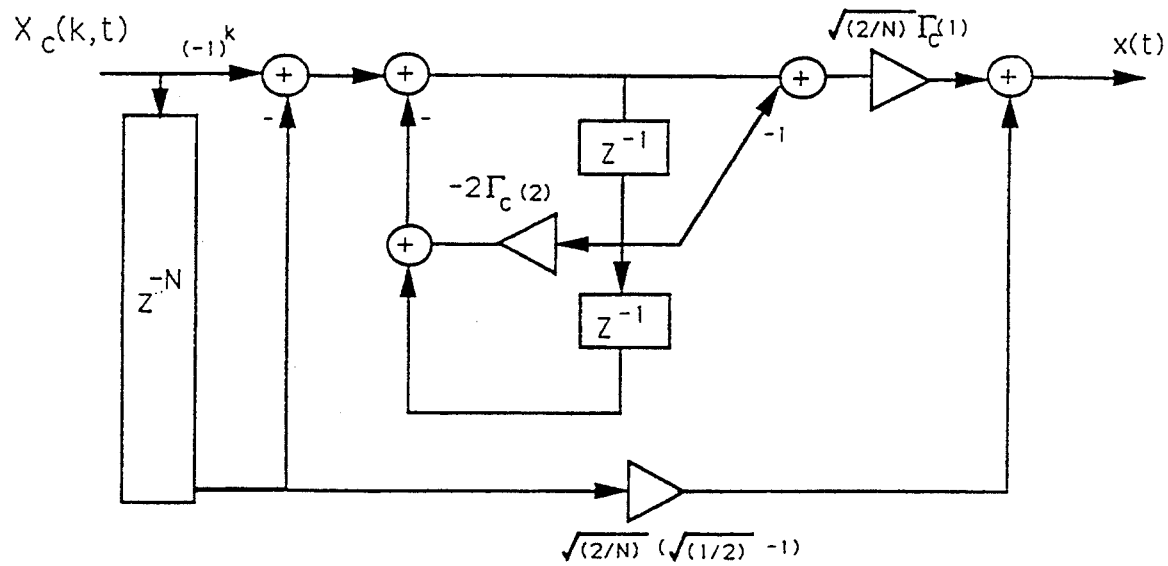
FIG. 20 is a block diagram of a IIR filter structure for an IDCT transform.

The architecture is shown in FIG. 20. Similarly, the IDST may be rewritten as:

$$x_s(n,t) = \sum_{k=t}^{t+N-1} X(k)\sin\left[\frac{\pi(2n+1)(k-t)}{2N}\right] + \sqrt{\frac{2}{N}} \left(\sqrt{\frac{1}{2}} - 1\right)X(t + N - 1)$$

whose transfer function is $$H_{is}(z) = \sqrt{\frac{2}{N}} \left((-1)^k - z^{-N}\right)\sin\frac{\pi k}{2N} \frac{(1 - z^{-1})}{\left(1 - 2\cos\frac{\pi k}{N} z^{-1} + z^{-2}\right)} + \sqrt{\frac{2}{N}} \left(\sqrt{\frac{1}{2}} - 1\right)$$

Figure 21:
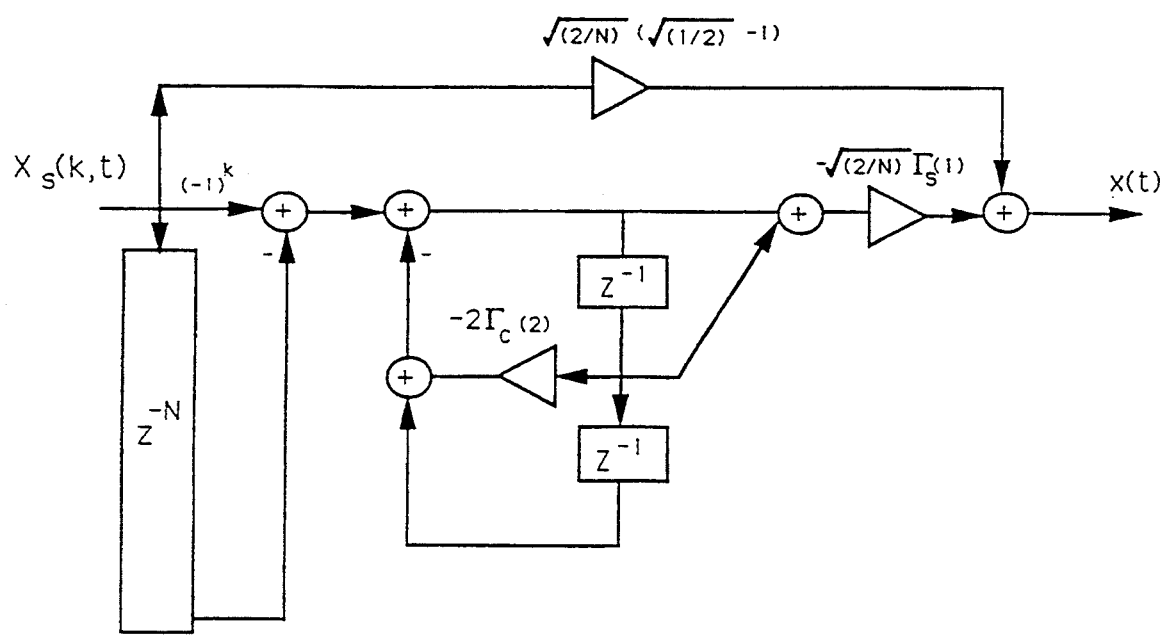
FIG. 21 is a block diagram of a IIR filter structure for an IDST transform.

The architecture for IDST is shown in FIG. 21.

The Inverse Complex Lapped Transform (ICLT) of samples is defined as:

$$x_{cl}(k,t) = \frac{1}{2\sqrt{N}} \sum_{k=t}^{t+N-1} [X(k) + X(k-1) + (-1)^k(X(k-1) + (-1)^k(X(k+N) + X(k+N-1))]\exp\left\{j\frac{(2n+1)(k-t)\pi}{2N}\right\}.$$

Figure 22:
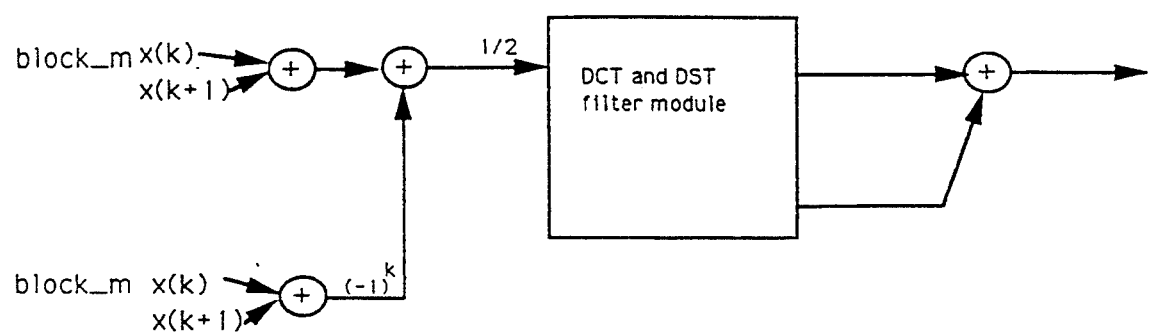
FIG. 22 is a block diagram of a filter structure for a IDCLT transform.

The architecture of the IDCLT is depicted in FIG. 22. From the previous derivation, it may be seen that the inverse transforms may be obtained by using the same architectures of the forward transforms with one additional branch of multiplier.

Theoretical Basis

The basis functions of all the discrete sinusoidal transforms mentioned above corresponds to a set of orthogonal polynomials. One of the important characteristics of orthogonal polynomials is that any three consecutive polynomials are related by the Fundamental Recurrence Formula given by:

$$P_n(k) = (k - c_n)P_{n-1}(k) - \lambda_n P_{n-2}(k).$$

The discrete transforms discussed in the previous section satisfy a simpler version of the recurrence relation. More precisely, the parameters $c_n$ and $\lambda_n$ are independent of n and the basis function $P_n(k)$ is periodic in n and k of period N. In these cases, the Fundamental Recurrence Formula may be rewritten as:

$$P_n(k) = (k - c)P_{n-1}(k) - \lambda P_{n-2}(k), n = 0, 1, \ldots, N-1,$$
$$k = 0, 1, 2, \ldots, N-1.$$

For different discrete sinusoidal transforms, the corresponding parameters k, c, λ in the Fundamental Recurrence Formula are stated in Table 6, below.

TABLE 6

| | k | c | λ | $P_0$ | $P_{-1}$ | $P_{N-1}$ | $P_N$ |
|---|---|---|---|---|---|---|---|
| DCT | $2\cos(\pi k/N)$ | 0 | 1 | $\cos(\pi k/2N)$ | $P_0$ | $(-1)^k P_0$ | $P_0$ |
| DST | $2\cos(\pi k/N)$ | 0 | 1 | $\sin(\pi k/2N)$ | $-P_0$ | $-(-1)^k P_0$ | $P_0$ |
| DHT | $2\cos(2\pi k/N)$ | 0 | 1 | 1 | $\cos(2\pi k/2)$ $\sin(2\pi k/N)$ | $P_{-1}$ | 1 |
| DFT | $2\cos(2\pi k/N)$ | 0 | 1 | 1 | $\cos(2\pi k/2)$ $-j\sin 2\pi k/N)$ | $P_{-1}$ | 1 |
| CLT | $\exp -j2\theta_k$ | 0 | $\exp -j4\theta_k$ | 1 | $\exp j2\theta_k$ | $(-1)^k$ | $(-1)^k j$ |

TABLE 6-continued

| k | c | Å | $P_0$ | $P_{-1}$ | $P_{N-1}$ | $P_N$ |
|---|---|---|-------|----------|-----------|-------|
| | $2\cos(\pi/2N)$ | | | $\cos(\pi/2N)$ | $\sin(\pi/2N)$ $j\exp j2\theta_k$ | |

Lemma 1: For all discrete transforms whose basis functions satisfy the Fundamental Recurrence Formula, the z-transform of the basis functions $\{P_n(k)\}$ may be expressed as a rational function with a second order denominator that is the characteristic equation of the Fundamental Recurrence Formula.

Proof: Since any $P_n(k)$ depends only on the previous two terms, the first two polynomial terms, $P_{-1}(k)$ and $P_{-2}(k)$, uniquely specify the entire set of basis functions.

Applying a z transform on index n to both sides of the Fundamental Recurrence Formula and $$P(z,k) = \sum_{n=0}^{N-1} z^{-n} P_n(k)$$

$$= \sum_{n=0}^{N-1} \{(k-c)z^{-n} P_{n-1}(k) - \lambda z^{-n} P_{n-2}(k)\}$$

$$= (k-c)\left[P_{-1}(k) + z^{-1}\sum_{n=0}^{N-1} z^{-n}P_n(k) - z^{-N}P_{N-1}(k)\right\} - \lambda\left[P_{-2}(k) + z^{-1}P_{-1}(k) + z^{-2}\sum_{n=0}^{N-1} Z^{-n}P_n(k) - z^{-N}P_{N-2}(k) - z^{-(N+1)}P_{N-1}(k)\right]$$

$$= (k-c)z^{-1}P(z,k) - \lambda z^{-2}P(z,k) + [(k-c)P_{-1}(k) - \lambda P_{-2}(k)] - \lambda z^{-1}P_{-1}(k) - z^{-N}[(k-c)P_{N-1}(k) - \lambda P_{N-2}(k)] + \lambda z^{-(N+1)}P_{N-1}(k)$$

$k = 1, 2, \ldots, N-1.$ factoring out $P(z,k)$, we obtain:

$$P(z,k) = \frac{z^{-(N-1)}\lambda P_{N-1}(k) - P_N(k)z^{-(N-2)} - \lambda P_{-1}(k)z^1 + P_0(k)z^2}{\lambda - (k-c)z + z^2}$$

$$= \frac{z^2(P_0(k) - P_N(k)z^{-N}) - \lambda z(P_{-1}(k) - P_{N-1}(k)z^{-1N})}{\lambda - (k-c)z + z^2}$$

Because of the second-order recurrence relation, the denominators of the z-transform of the basis functions are second-order polynomials in z.

The characteristic equation of the Fundamental Recurrence Formula is obtained by solving the homogeneous solutions of the difference equation. The homogeneous equation is given by:

$$P(z,k) = (k-c)P(z,k)z^{-1} - \lambda P(z,k)z^{-2}.$$

Combining both sides of the equation, we have:

$$P(z,k)z^{-2}(\lambda - (k-c)z + z^2) = 0.$$

Since $P(z,k)$ does not equal to zero, we have that $(\lambda - (k-c)z + z^2)$ equals to zero and hence the characteristics equation is $(\lambda - (k-c)z + z^2)$, which is the denominator.

The transfer function of the discrete transforms (DXT) may be rewritten as:

$$X(k,t) = C(k)\sum_{n=0}^{N-1} x(n+t)P_n(k), t = 0,1,2,\ldots$$

Performing the z-transform on the index t on both sides of the above equation, we have:

$$H_X(z) = C(k)z^{-(N-1)}\sum_{n=0}^{N-1} z^n P_n(k) = C(k)z^{-(N-1)}P(z^{-1},k)$$

which is the z-transform of the basis orthogonal polynomials with index z replaced by $z^{-1}$ and multiplied by $C(k)z^{-(N-1)}$. That is, the transfer function of the discrete transform may also be expressed as a rational function with a second order denominator:

$$H_X(z) = $$

$$C(k)\frac{\lambda P_{N-1}(k) - P_N(k)z^{-1} - \lambda P_{-1}(k)z^{-N} + P_0(k)z^{-(N+1)}}{(\lambda - (k-c)z^{-1} + z^{-2})}.$$

Here we illustrate another way to derive the transfer function of the discrete sinusoidal transforms. Substituting the coefficients listed in Tables 5 and 6, we obtain the transfer functions derived above.

Lemma 2: To compute the discrete sinusoidal transforms time recursively, we have to factor out the updating component $(1-z^{-N})$ or $(1+z^{-N})$ in the filter realization. There exists an updating component $(1+z^{-N})$ or $(1-z^{-N})$ in the nominator of the transfer function of the discrete sinusoidal transform, if and only if the boundary conditions of the basis function satisfy $P_0 = +P_N$ and $P_{-1} = +P_{N-1}$.

Proof: If the updating vector can be realized by $(1+z^{-N})$ or $(1-z^{-N})$, then the nominator must contain the factor $(1+z^{-N})$ or $(1-z^{-N})$. That is, the nominator can be expressed as:

$$\lambda P_{N-1}(k) - P_N(k)z^{-1} - \lambda P_{-1}(k)z^{-N} + P_0(k)z^{-(N+1)} = (1 \pm z^{-N})(a + bz^{-1}),$$

since it is a (-N-1) degree polynomial. By expanding the right side of the above equation, we have:

$$\lambda P_{N-1}(k) - P_N(k)z^{-1} - \lambda P_{-1}(k)z^{-N} + P_0(k)z^{-(N+1)} = a + bz^{-1} \pm az^{-N} \pm bz^{-N-1},$$

it follows that:

$$a = \mp \lambda P_{-1}(k) = \lambda P_{N-1}(k)$$

$$b = \mp P_0(k) = -P_N(k),$$

and $P_0(k) = \pm P_N(k)$ $P_{-1}(k) = \mp P_{N-1}(k)$.

This proves the necessary condition. If $P_0 = +P_N$ and $P_{-1} = +P_{N-1}$, then the nominator becomes:

$$\lambda P_{N-1}(k) - P_N(k)z^{-1} - \lambda P_{-1}(k)z^{-N} + P_0(k)z^{-(N+1)} = \mp \lambda P_{-1}(k) \pm P_0(k)z^{-1} - \lambda P_{-1}(k)z^{-N} + P_0(k)z^{-(N+1)}$$
$$= (1 \pm z^{-N})(\lambda P_0(k)z^{-1} \mp \lambda P_{-1}(k)),$$

which means the nominator contains the factor $(1+z^{-N})$. Lemma 3: All the transforms that satisfies Lemma 1 and Lemma 2 can be realized by an updating FIR filter with transfer function $(1-z^{-N})$ or $(1+Z^{-N})$, and an IIR filter with second order denominator and first order nominator whose coefficients are dependent on) $\lambda(k-c)$, $P_0$ and $P_{-1}$. Proof: If Lemma 1 and Lemma 2 are satisfied, the transfer function may be expressed as:

$$H_x(z) = C(k) \frac{(1 \pm z^{-N})(\lambda P_{N-1} - P_N z^{-1})}{(\lambda - (k-c)z^{-1} + z^{-2})}$$

Therefore, the transform may be realized by the filter structure as shown in FIG. 2. The coefficients are:

$D1 = (k-c)$ $D2 = \lambda$ $N1 = \lambda P_{N-1}$ $N2 = -P_N$

Lemma 3 implies that if a transform may be computed time-recursively, a maximum of four multipliers required to realize the transform. FIG. 2 shows a good example of this case. Lemma 4: For the discrete sinusoidal transforms, the roots of the characteristic equating belong to the set of the root of $1+z^{-N}$.

Proof: Since the discrete sinusoidal transform is FIR in natural, the roots of the denominators should be canceled by the zeros of the nominator. In general, the roots of the denominator are complex conjugate poles because of $(k-c)^2 - 4\lambda < 0$. Therefore, the poles should be canceled by the zeros of the $(1+z^{-N})$, and the roots of the denominators are:

$$z1, z2 = \frac{(k-c) \pm \sqrt{(k-c)^2 - 4\lambda}}{2\lambda}$$

$$\epsilon \begin{cases} \exp \frac{j2\pi n}{N} & n = 0,1,2,\ldots,N-1, z^N = 1 \\ \exp \frac{j\pi(2n+1)}{N} & n = 0,1,2,\ldots,N-1, z^N = -1. \end{cases}$$

All the discrete sinusoidal transforms listed in Table 4 satisfies Lemmas 1 through 4. Therefore, these transforms may be computed time recursively and may be realized by a FIR filter with transfer function $(1+z^{-N})$ and an IIR filter with second order polynomials. These facts support the results obtained above. Lemma 5: If two transforms can be dually generated, then they share the same autoregressive model in their IIR filter structure.

Proof: The basis polynomial $p_n$ and $q_n$ of the dual generated transform pairs satisfy the following equations:

$$p_n = D_{xc} p_{n-1} + D_{xs} q_{n-1}$$

$$q_n = D_{xc} q_{n-1} - D_{xs} p_{n-1}$$

Since $p_n$ and $q_n$ are dually generated and from (64), they have the same characteristic equation. That is:

$$I - Az^{-1} = 0$$

where:

$$A = \begin{bmatrix} D_{xc} & D_{xs} \\ -D_{xs} & D_{xc} \end{bmatrix}$$

As shown in Lemma 1, the roots of the denominators are the roots of the characteristics equation. Since $p_n$ and $q_n$ have the same characteristic equation, they have the same denominator. Hence, both transforms have identical poles, and as a result, the same autoregressive filter form.

EXAMPLE 1

The DCT and DST are dual generated transform pairs and share the same second order denominator. The DCT and DST satisfy:

$$\cos\left[\frac{\pi(2(n+1)+1)k}{2N}\right] =$$

$$\cos\left[\frac{\pi k}{N}\right]\cos\left[\frac{\pi(2n+1)k}{2N}\right] -$$

$$\sin\left[\frac{\pi k}{N}\right]\sin\left[\frac{\pi(2n+1)k}{2N}\right]$$

$$\sin\left[\frac{\pi(2(n+1)+1)k}{2N}\right] =$$

$$\cos\left[\frac{\pi k}{N}\right]\sin\left[\frac{\pi(2n+1)k}{2N}\right] +$$

$$\sin\left[\frac{\pi k}{N}\right]\cos\left[\frac{\pi(2n+1)k)}{2N}\right],$$

it follows that:

$$D_{xc} = \cos\left[\frac{\pi k}{n}\right],$$

$$D_{xs} = -\sin\left[\frac{\pi k}{N}\right].$$

The poles are the root the following equation, which is the same as the characteristic equation derived from the Lemma 1. This is why the CT, DST and DFT, DHT are the same second order autoregressive structure. From Lemma 3, it is noted that a maximum of 4N multipliers is required to realize the transform. Due to $\lambda = 1$ and $P_N = +P_{N-1}$ for the case of the DCT and ST, we may see that 2N multipliers for the DCT and DST is minimum for this realization. Based on Lemma 5, we may combine the denominator together for the dual generation of DCT and DST. This gives an average 1.5N multipliers to realize the DCT or DST. We believe that this is the best we can achieve for real time computation.

Unified Time-Recursive Based Multi-dimensional Discrete Sinusoidal Transforms Multi-dimensional transforms provide powerful tools for multi-dimensional signal processing. Some of the important applications are in the areas of signal reconstruction, speech processing, spectrum analysis, tomography, image processing, and computer vision. Specifically, in multispectral imaging, interframe video imaging, and computer tomography, we have to work with three or higher dimensional data. It is difficult to generalize the existing fast 1-D algorithms to 3-D or higher dimensional transforms. However, the time-recursive concept may be extended to multi-dimensional transforms resulting in architectures that are simple, modular, and hence suitable for large scale integration (LSI) implementation. The 3-D CT is very useful in processing interframe video imaging data, we first describe the filter architecture for the 3-D DCT, and then generalize it to any multi-dimensional sinusoidal transform.

transform at time t. The operations may be divided into two parts, one consists of computing the difference of the input data between time t and (t+1) and the other consists of performing the recursive updating. Looking at the basic architecture of computing 1-D DXT as shown in FIG. 2, the basic structure consists of three components: shift registers, adders, and IIR arrays. The shift register is used to store the input data from x(t) to x(t+N); adders are used to compute the difference data x(t) and x(t+N) and the IIR arrays are used to perform the computation recursively. It may be shown that the d-D DXT may be computed by using d blocks consisting of shift registers, adders, and filter arrays, each performing the time-recursive computation along a dimension.

Figure 10:
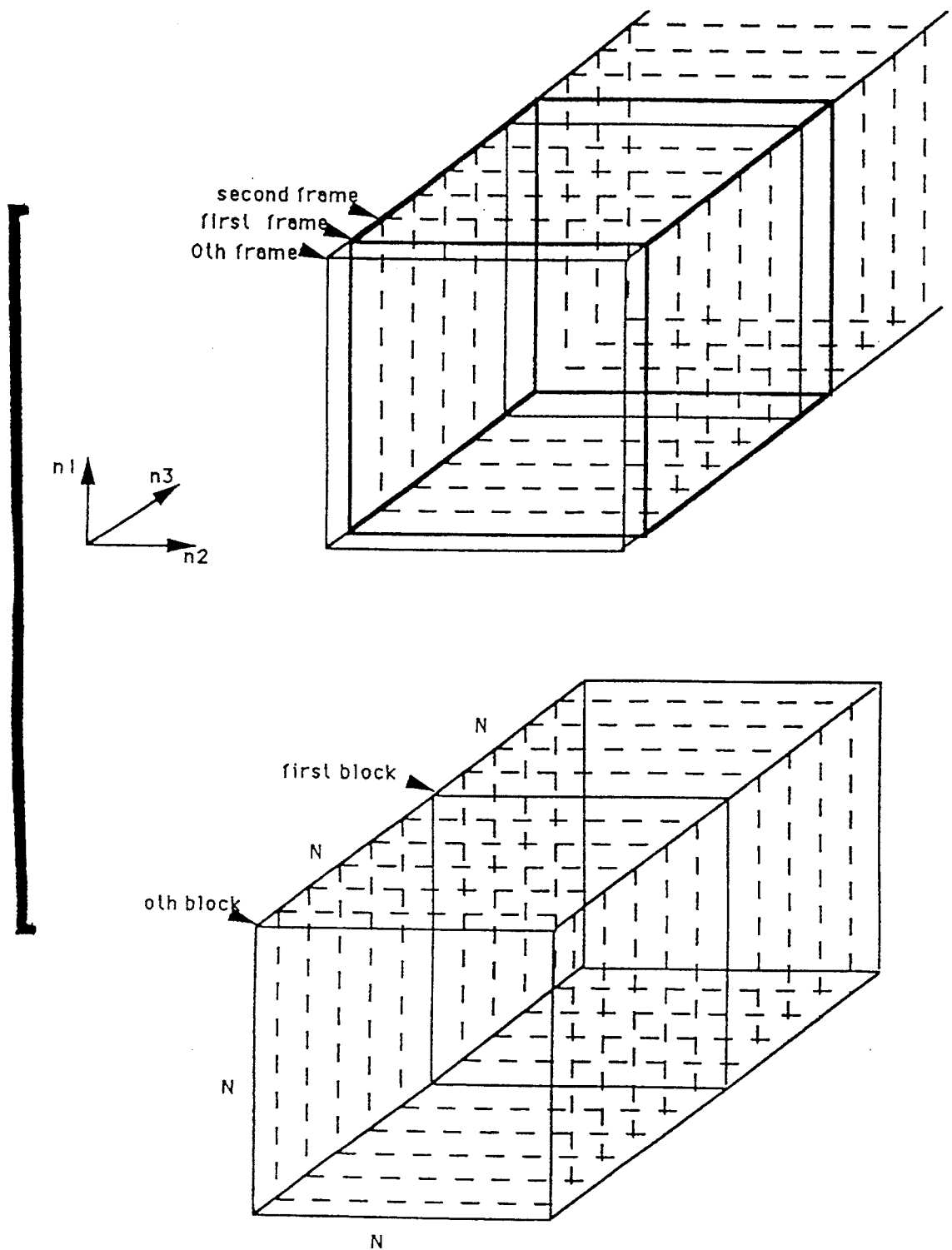
FIG. 10 is a graphical representation of a time-recursive based 3-D transform.

For 1-D time-recursive DXT, the input data window is moved one sample at a time. That is, the input data vector at time t is given by the vector, and at time (t+1) the input data consists of the vector. The time-recursive relation for the 2-D transforms is based on updating the input data row by row. The input data sequences for time-recursive 3-D transforms are as shown in FIG. 10. Here, it is assumed that input data is updated frame by frame in the third axis $n_3$, that is, the range of the input data $x(n_1, n_2, n_3)$ is $\{n_1=0, \ldots, N-1; n_2=0, \ldots, N-1; n_3=0,1,2,\ldots\}$. The input data frame $x(n_1, n_2, t)$ for a specific index t as the $t_{th}$ frame input data. The 3-D DCT of the t the frame input data is defined as:

$$X_{C3}(k_1,k_2,k_3,t) = C(k_1)C(k_2)C(k_3) \sum_{n_1=0}^{N-1} \sum_{n_2=0}^{N-1} \sum_{n_3=t}^{t+N-1} x(n_1,n_2,n_3)\cos\left[\frac{\pi(2n_1+1)k_1}{2n}\right]$$

$$\cos\left[\frac{\pi(2n_2+1)k_2}{2n}\right]\cos\left[\frac{\pi[2(n_3-t)+1]k_3}{2N}\right].$$

The 3-D DCT of the (t+1) frame input data $\{n_1=0, \ldots, N-1; n_2=0, \ldots, N-1; n_3=t+1, \ldots, t+N.\}$ is:

$$X_{C3}(k_1, k_2, k_3, t+1) = C(k_1)C(k_2)C(k_3) \sum_{n_1=0}^{N-1} \sum_{n_2=0}^{N-1} \sum_{n_3=t+1}^{t+N} x(n_1,n_2,n_3)\cos\left[\frac{\pi(2n_1+1)k_1}{2n}\right]$$

$$\cos\left[\frac{\pi(2n_2+1)k_2}{2n}\right]\cos\left[\frac{\pi[2(n_3-t-1)+1]k_3}{2N}\right].$$

The concept of time-recursive approach is to update the 3-D DCT of the (t+1) frame input data based on $X_{c_3}(k_1,k_2,k_3,t)$. The time-recursive relations between the 3-D DCT $X_{c_3}(k_1,k_2,k_3,t+1)$ of the (t+1) $t_{th}$ input frame and the 3-DCT $X_{c_3}(k_1,k_2,k_3,t)$ of the $t_{th}$ input frame are:

$$X_{C3}(k_1,k_2,k_3,t+1) = \left[X_{C3}(k_1,k_2,k_3,t) + X_{C2}[k_1,k_2,t_\Delta]\frac{2}{N}C(k_3)\cos\left(\frac{\pi k_3}{2N}\right)\right].$$

$$\cos\left(\frac{\pi k_3}{N}\right) + \left[X_{C2s}(k_1,k_2,k_3,t) + X_{C2}[k_1,k_2,t_\Delta]\frac{2}{N}C(k_3)\sin\left(\frac{\pi k_3}{2N}\right)\right]\sin\left(\frac{\pi k_3}{N}\right).$$

Time-Recursive Structures for 3-D DCT

The basic concept of time-recursive computation is to compute the new transform at time (t+1) based on the Here we introduce another 3-D transform $X_{c2s}(k_1,k_2,k_3,t)$ defined as:

$$X_{C3s}(k_1,k_2,k_3,t) = C(k_1)C(k_2)C(k_3) \sum_{n_1=0}^{N-1} \sum_{n_2=0}^{N-1} \sum_{n_3=t}^{t+N-1} x(n_1,n_2,n_3) \cos\left[\frac{\pi(2n_1+1)k_1}{2n}\right].$$

$$\cos\left[\frac{\pi(2n_2+1)k_2}{2n}\right] \cos\left[\frac{\pi[2(n_3-t)+1]k_3}{2N}\right].$$

Figure 12:
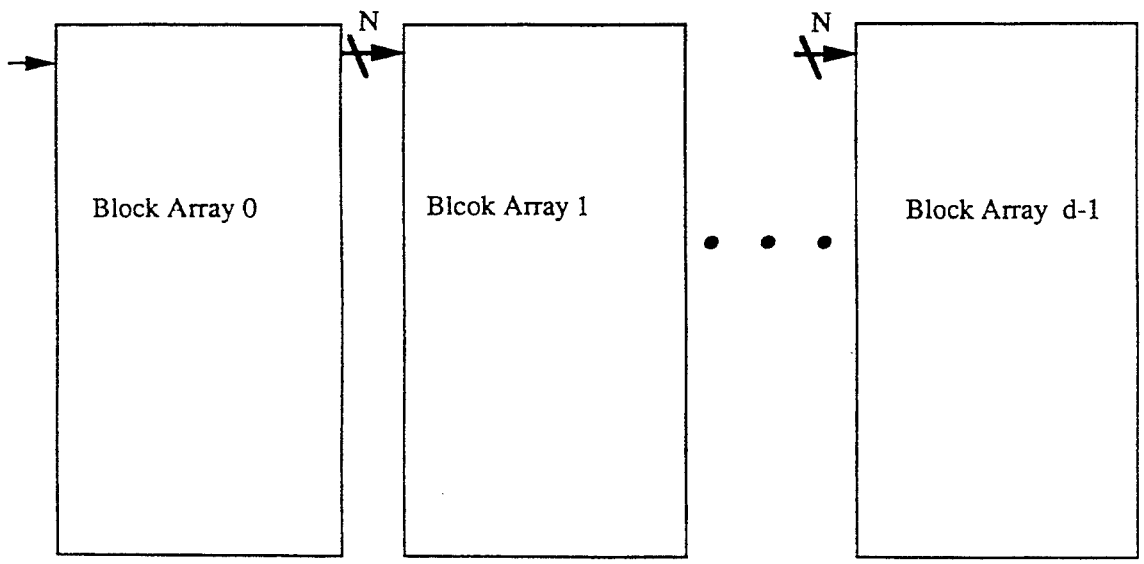
FIG. 12 is a block diagram of a 2-D DXT transform.

A similar relation exists between the updated transform $X_{c2s}(k_1,k_2,k_3,t+1)$ and the previous transform $X_{c2s}(k_1,k_2,k_3,t)$, that is:

$$X_{c2s}(k_1,k_2,k_3,t+1) = \left[X_{c2s}(k_1,k_2,k_3,t) + X_{c2}[k_1,k_2,t_\Delta]\frac{2}{N}C(k_3)\cos\left(\frac{\pi k_3}{2N}\right)\right].$$

$$\cos\left(\frac{\pi k_3}{N}\right) + \left[X_{c3}(k_1,k_2,k_3,t) + X_{c2}[k_1,k_2,t_\Delta]\frac{2}{N}C(k_3)\sin\left(\frac{\pi k_3}{2N}\right)\right]\sin\left(\frac{\pi k_3}{N}\right),$$

where $t_\Delta$ in $X_{c2}[k_1,k_2,t_\Delta]$ implies that the input data (here we denote as $\Delta(t+N, t)$) of the 2-D DCT are based on difference of two frames and $\Delta(t+N, t)$ is given by:

$$\Delta(t+N,t) = (-1)^{k_3} x(n_1,n_2,t+N) - x(n_1,n_2,t),$$

which is a 2-D data frame obtained from the difference between the $(t+N)$ $t_{th}$ and the $t_{th}$ input data frames as shown in FIG. 10. This is the first part of the time-recursive computation. The 2-D DCT $X_{c2}(k_1,k_2,\Delta(t+N,t))$ may be rewritten as:

$$X_{c2}(k_1,k_2,\Delta(t+N,t)) =$$

$$(-1)^k C(k_1)C(k_2) \sum_{n_1=0}^{N-1} \sum_{n_2=0}^{N-1} x(n_1,n_2,t+N)\cos\left[\frac{\pi(2n_1+1)k_1}{2N}\right]\cos\left[\frac{\pi(2n_2+1)k_2}{2N}\right] -$$

$$C(k_1)C(k_2) \sum_{n_1=0}^{N-1} \sum_{n_2=0}^{N-1} x(n_1,n_2,t)\cos\left[\frac{\pi(2n_1+1)k_1}{2N}\right]\cos\left[\frac{\pi(2n_2+1)k_2}{2N}\right].$$

above equation suggests that the 2-DCT of each frame may be computed first and stored in a shift register array of size $(N+1)\times N^2$. The difference between the 2-D DCT of the $t_{th}$ frame and $(t+N)$th frame is then computed. Equations indicate that the 3-D DCT may be generated by feeding the 2-D DCT of the updating vector into a lattice module as shown in FIG. 12. The size of the shift register in the lattice module is $N^2$ because for a specific $k_3$ there are $N^2$ values ($k_1=0, \ldots, N-1; k_2=0, \ldots, N-1$) to be updated. A similar updating relation exists for the 2-D DCT and the 1-D DCT. The number of shift registers in the lattice module for 2-D and 1-D DCT are N and 1 respectively. In fact, any d-D DCT may be obtained from the 1-D DCT by repeated application of the above equations. Therefore, the time-recursive 3-D DCT lattice structure consists of three lattice arrays which are used to produce the 1-D, 2-D and 3-D DCT individually. The 3-D DCT may be implemented using either the lattice or the filter structures as described below.

Lattice 3-D DCT architecture

Figure 5:
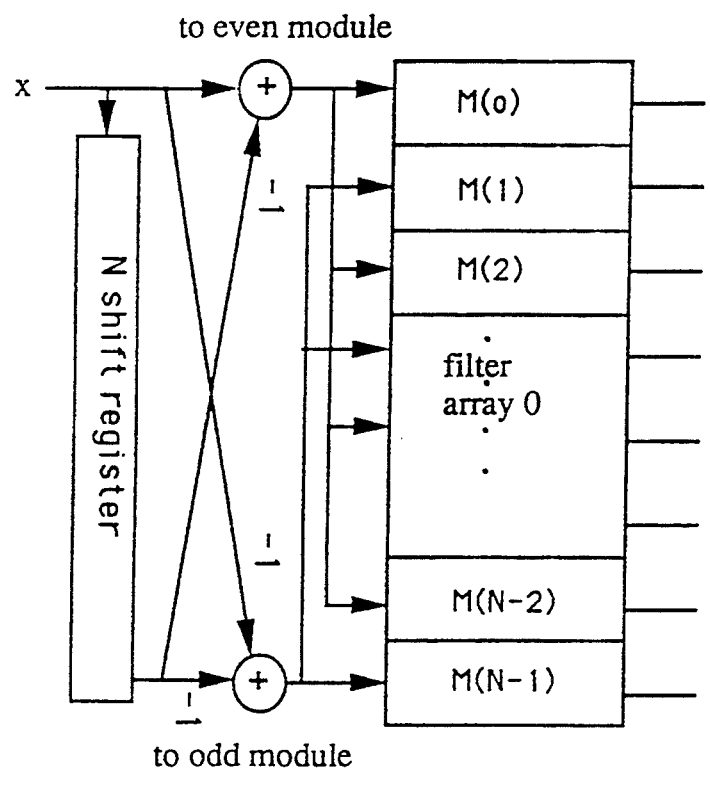
FIG. 5 is a diagram showing Lattice Array Block 0.
Figure 6:
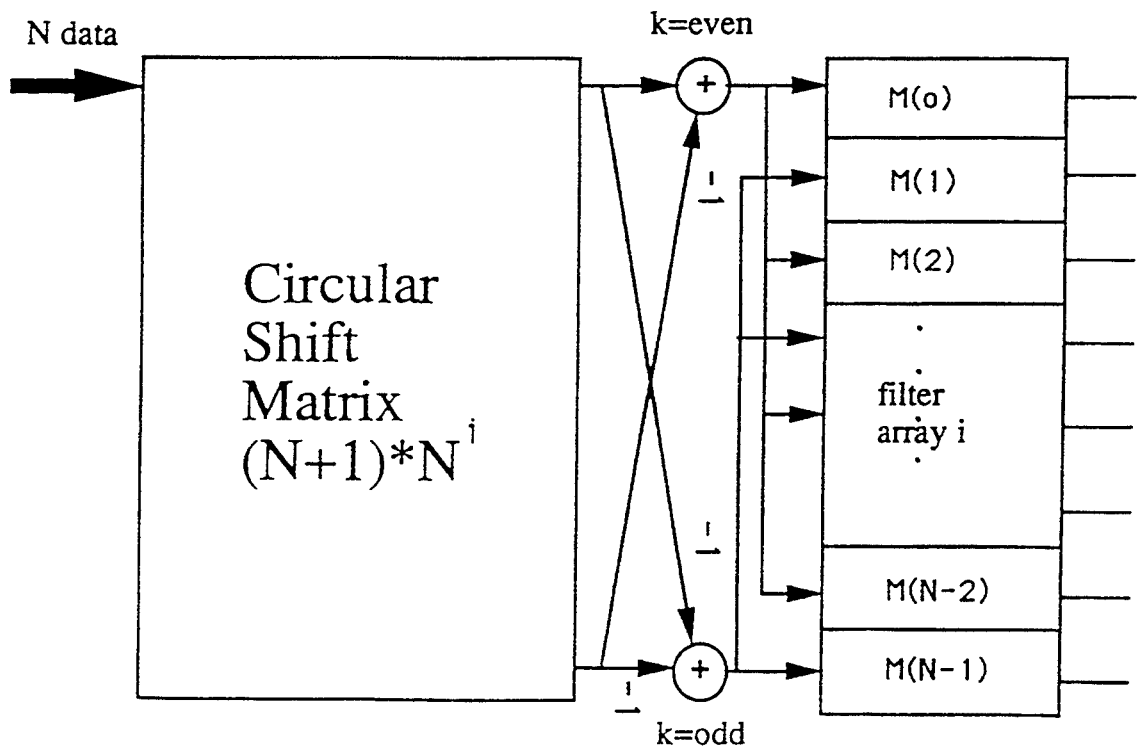
FIG. 6 is a diagram of the structure for Lattice Array Block, where i=1,2,3, ... , n−1.
Figure 7:
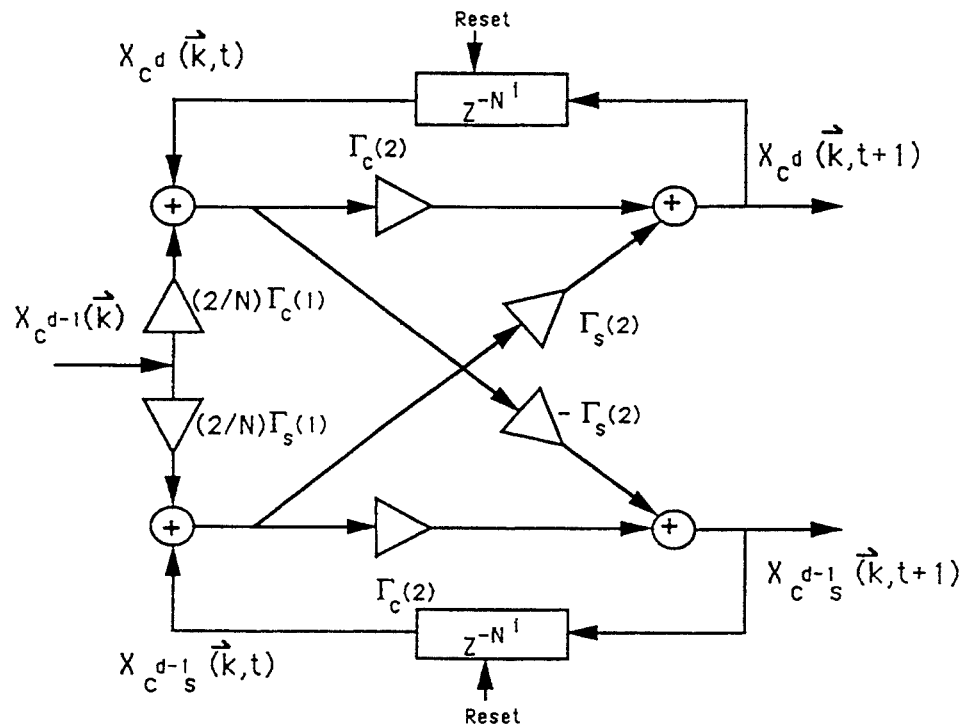
FIG. 7 is a diagram of a lattice module for 3-D analysis.
Figure 8:
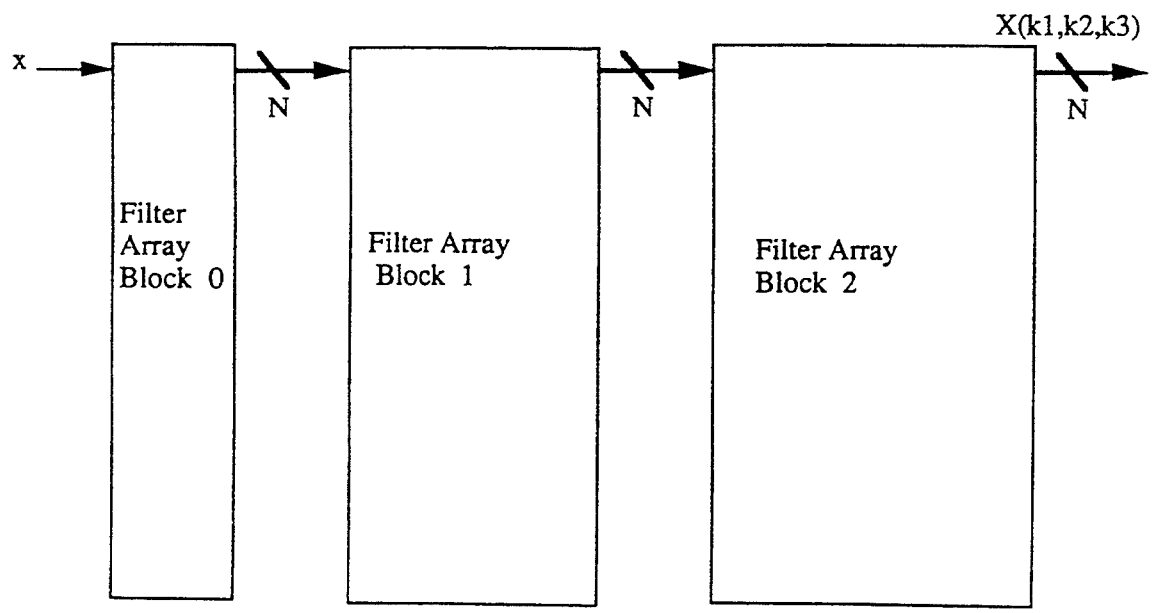
FIG. 8 is a block diagram of the architecture for a frame-recursive 3-D DCT transform.

The architecture of the frame-recursive lattice 3-DCT is depicted in FIG. 8. It consists of three Lattice Array Blocks (LAB0, LAB1, LAB2) whose configurations are depicted in FIGS. 5 and 6. The lattice array LABi consists of a shift register array, two adders, and a lattice array, the shift register array is of size $(N+1)\times N^i$ and is used to store intermediate values. The function of the adders is to update the effect of new data and eliminate the effect of previous data. The structure of the lattice array is shown in FIG. 7. The difference between different lattice arrays is only in the number of delays in the feedback loop. There are $N^i$ delay elements in the (i)the array.

The operation of this architecture may be viewed as follows. Input data is scanned row by row and frame by frame and sent to the first module LAB0 which generates the 1-D DCT of each row on every input frame. When the last datum of each row is available, the 1-D DCT of each input row vector is obtained. The N 1-D DCT transformed data is loaded in parallel into the second module LAB1 every N clock cycles. The LAB1 module is used to generate the 2-D DCT of each data frame. After $N^2$ clock cycles, when the last datum of each frame arrives, the 2-D DCT of each frame is available. These values are loaded in parallel into the LAB2 module to generate the 3-D DCT recursively. The difference between the 2-D DCT of the parity of the $(t+N)t_{th}$ and $t_{th}$ frame is used as the input to the LAB2 module. There are $N^2$ shift registers in the feedback loop of LAB2 to store the transformed data of each frame. It takes $N^2$ cycles to finish updating a new 3-D block and this is the period required to obtain a new 2-D DCT data block. It is easy to verify that the system is fully-pipelined.

Figure 9:
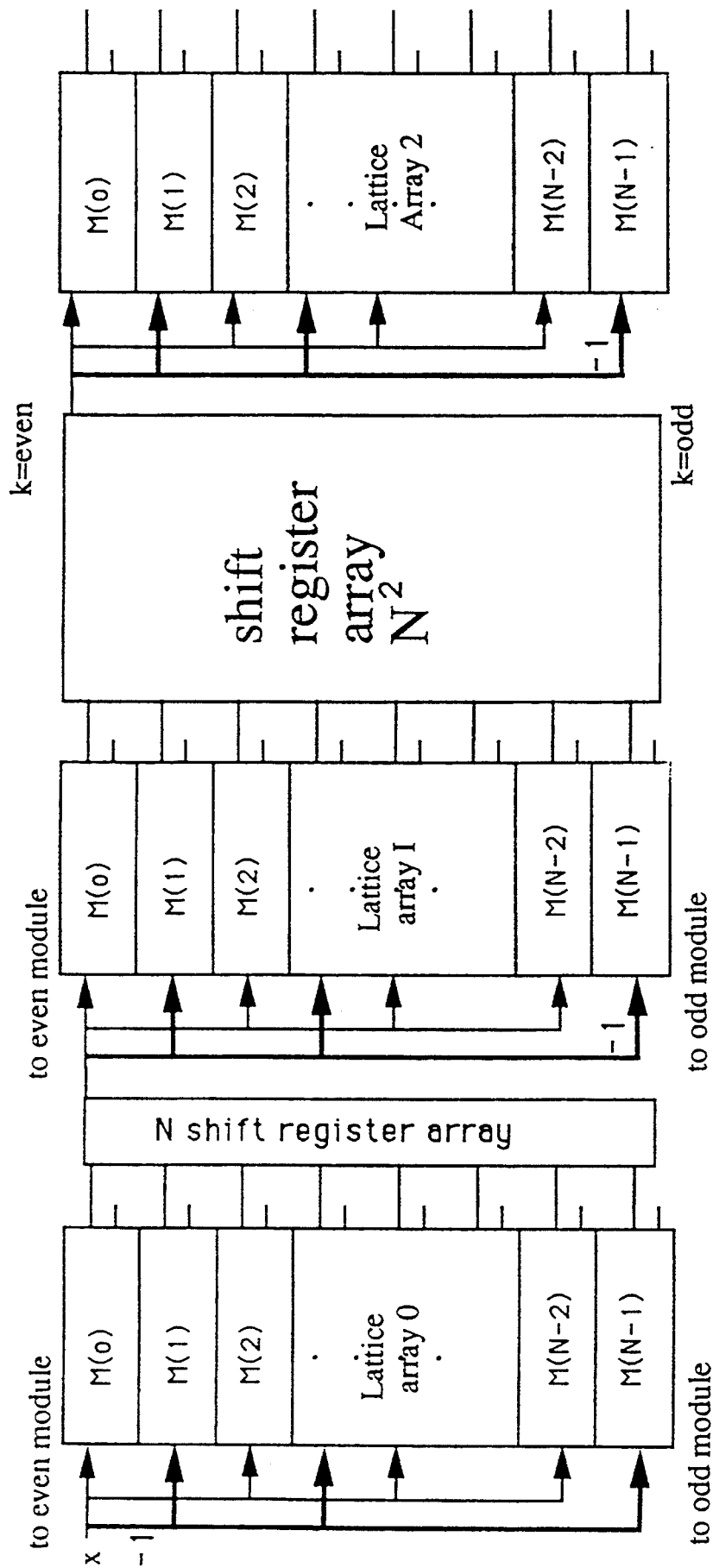
FIG. 9 is a block diagram of the architecture for a 3-D DCT transform.

In applications where only block multi-dimensional transforms are required, the above architecture may be simplified. Intermediate values stored in shift registers are not necessary. The purpose of the shift registers is to store the current data obtained from the filter arrays, hence its size is reduced to $N^i$ for Lattice Array Block i. Since updating is unnecessary, the two adders may be eliminated. The lattice block 3-D DCT structure is shown in FIG. 9.

IIR 3-D DCT architecture

Figure 11:
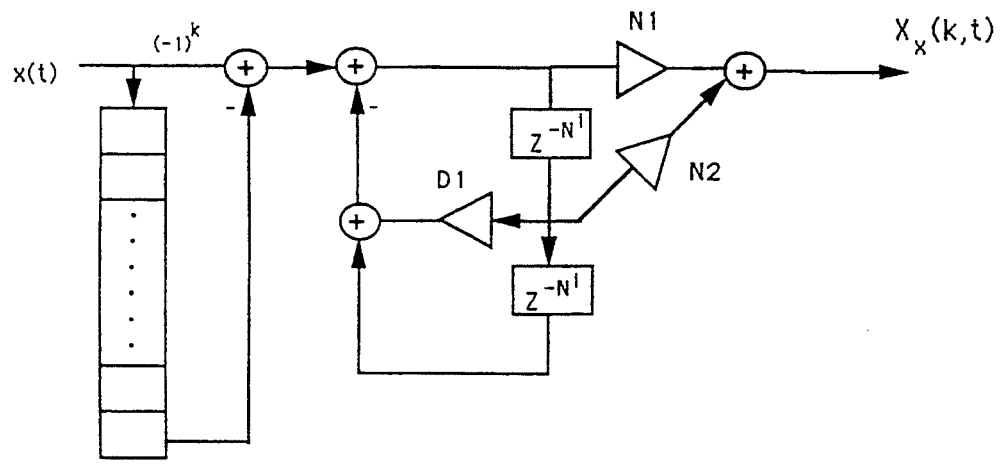
FIG. 11 is a block diagram of a configuration of a direct form filter 3-D block DCT transform.

The lattice structure may be realized as a directly as a digital filter by considering the transfer function of each lattice module. This approach is used to convert the time-recursive lattice 3-D DCT structure into its direct form configuration. The only difference between lattice and IIR 3-D DCT architecture is that the lattice array i is replaced by direct for filter array i. The direct form of the lattice module in FIG. 7 is depicted in FIG. 11. The size of the shift register in direct form realization is the same as that of lattice modules. The configuration of the direct form filter 3-D block DCT is depicted in FIG. 11.

Time-Recursive Structures for Multi-Dimensional DXT

The time-recursive concept is generalized to any multi-dimensional DXT and then derive the fully-pipelined block structures. Denote by the $[x(\vec{n}_d,t)]$ the input data file at time t, and by $[x(\vec{n}_d,t)]$ the data file at time $(t+1)$ which is obtained by shifting $[x(\vec{n}_d,t)]$ in a direction of one of the axes by one unit. For simplicity, let us assume that the data file is shifted in the direction of the last axis, $n_d$. The d-dimensional DXT of the input data file $[x(\vec{n}_d,t)]$ is defined as:

$$X_{Xd}(\vec{k}_d,t) = \sum_{n_1=0}^{N-1} \sum_{n_2=0}^{N-1} \ldots \sum_{n_d=0}^{t+N-1} x(\vec{n}_d,t)P_{nd}(\vec{k}_d),$$

Here, we assume that the transform kernel $P_d(\vec{k}_d)$ is separable. That is:

$$P_d(\vec{k}_d) = P_{n_1}(k_1)P_{n_2}(k_2) \ldots P_{n_d}(k_d).$$

From the analysis in above, it may be seen that the updated transform $X_{xd}(\vec{k}_d,t+1)$ is related to the previous transform by:

$$X_{Xx}\vec{K}_d,t+1) = \{X_{xd}(\vec{K}_d,t) + X_{xd-1}[\vec{K}_{d-1},\Delta(t+N,t)] - D_x(k)\}\Gamma_x(k),$$

where $\Delta(t+N,t)$ is the difference between the data files at time t and $(t+N)$ and $D_x(K)$ and $\Gamma_x(k)$ are coefficients that depend only on the transform kernel and index k. The above equation indicates that the d-dimensional DXT may be updated recursively using the previous transformed data $X_{xd}(\vec{k}_d,t)$ and $(d-)$-D DXT of $\Delta(t+N,t)$. This relation may be used recursively such that any d-D DXT may be generated from the 1-D DXT using d filter blocks as shown in FIG. 12.

Figure 13A:
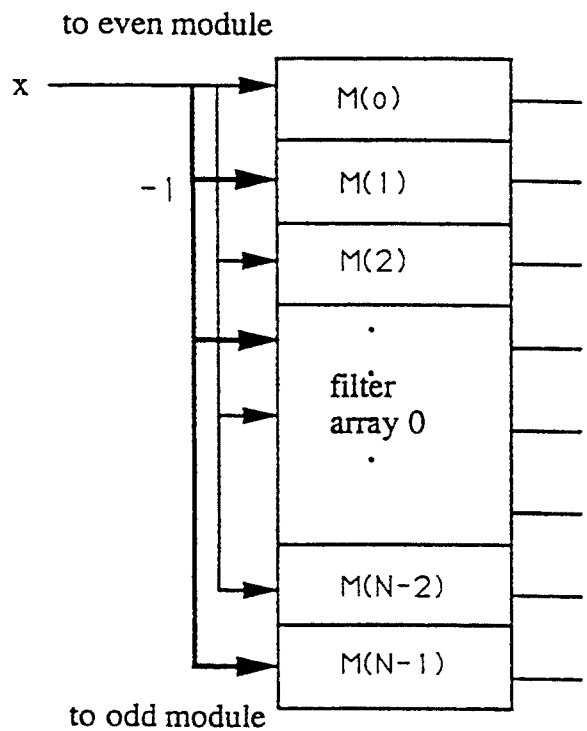
FIGS. 13a and 13b are block diagrams of basic building structure of a moving frame DXT transform.
Figure 13B:
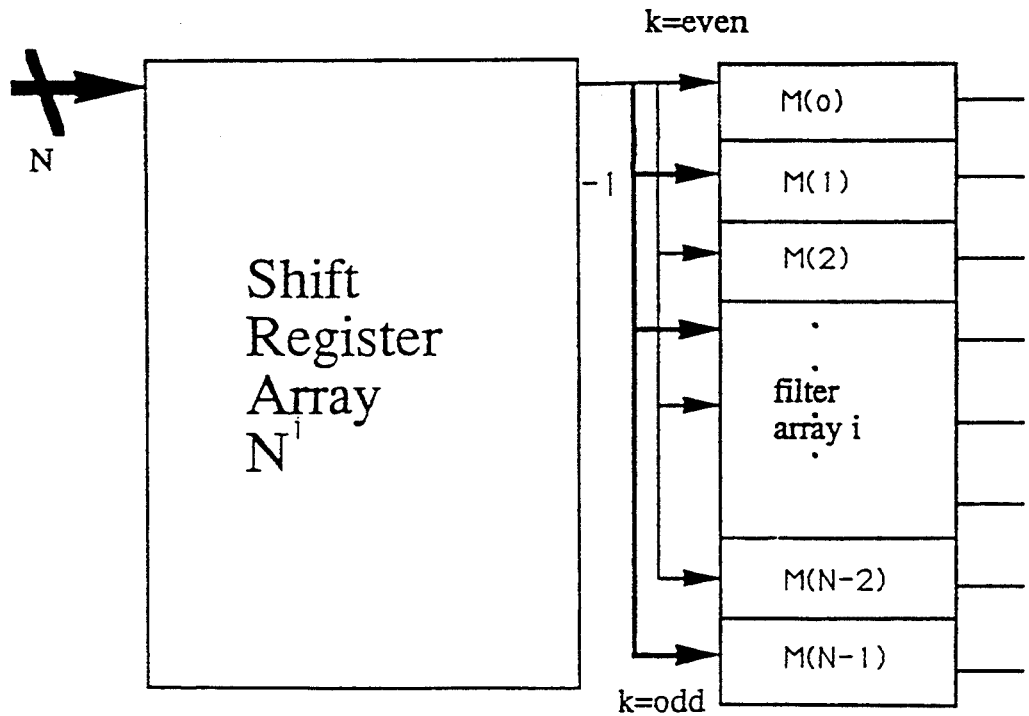

As described in the previous section, there are two kinds of time-recursive DXT architectures, the moving-frame 3-D DXT and the block d-D DXT. The structure of the basic building block in the moving-fame DXT is shown in FIG. 13, where the filter array may be either the lattice or the filter form. The function of each block is to shift the $(d-1)$-dimensional data into a data back, then distribute the difference of the first and last frame of the data back to the second stage DXT array. The dimension of the shift register array is $(N+1) \times N^i$ and the delay in filter array is $N^i$. The time required to obtain the $(d-1)$-dimensional DXT is $N^{d-1}$, which is also the time required to obtain the $N^d$ elements of the transformed data.

Figure 14A:
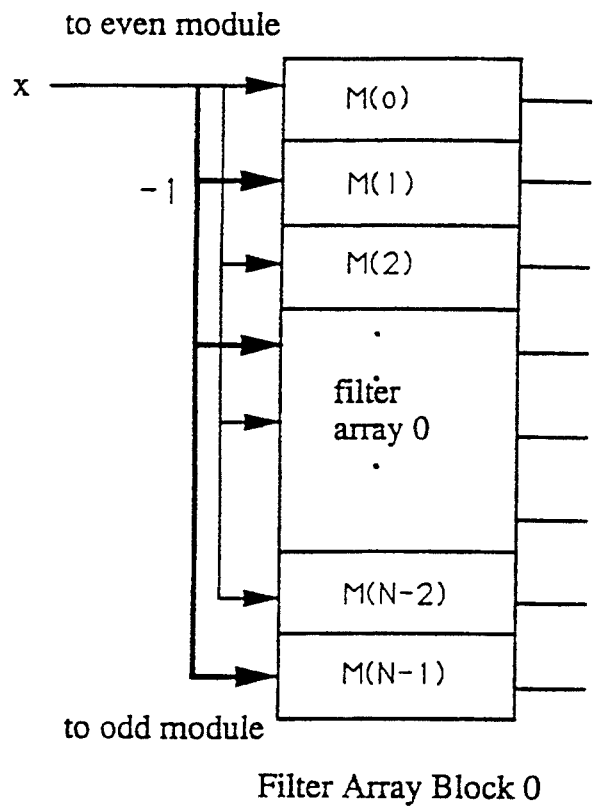
FIGS. 14a and 14b are block diagrams of basic structures of a block DXT transform.
Figure 14B:
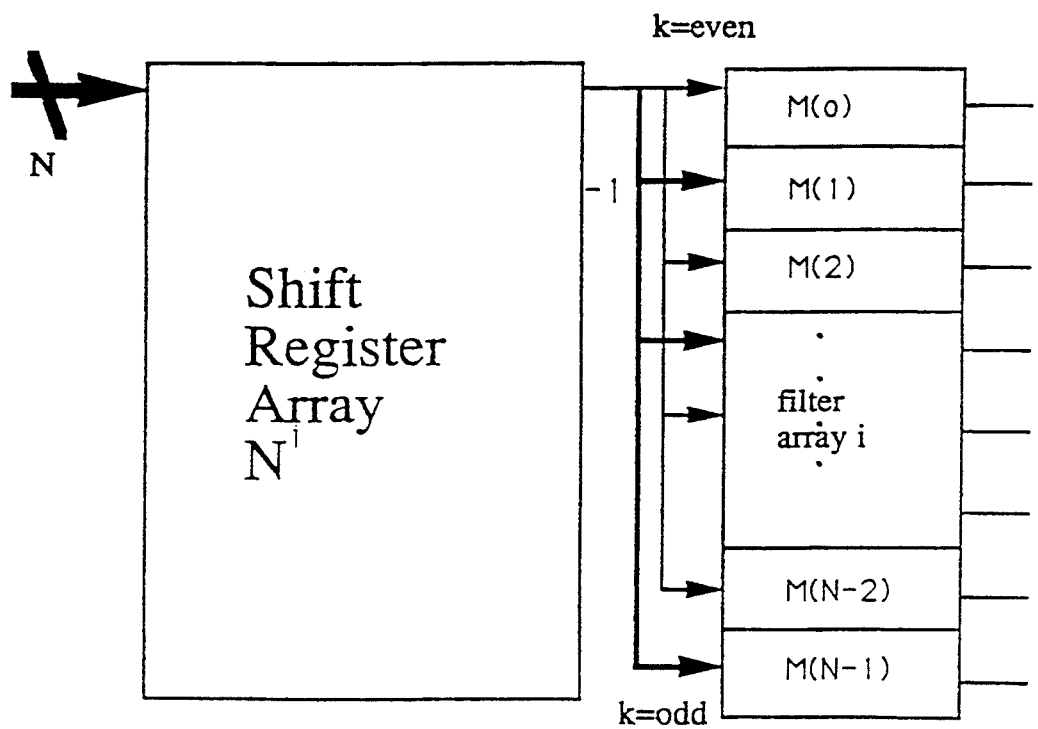

In the case of block DXT, the size of the shift register array may be reduced and adders may be eliminated because intermediate transformed data do not have to be stored, The size of the shift register array is $N^i$. The structure of the LAB is shown in FIG. 14. The lattice array i is reset very $N^{i+1}$ cycles.

Area-Time Complexity Analysis

The present invention's architecture for computing the d-dimensional transform DXT over $N^d$ points consists of d blocks, each block is composed of a shift register array followed by a one-dimensional lattice or IIR structure made up of N DXT modules. The (i)the shift register array is of size $(N+1) \times N^i b$, where $0 < i < d-1$ and b is the number of bits used to represent each number. The output is generated in a shift register array of size $N^d b$. Therefore the total number of multipliers and adders used is $O(dN) = O(N)$, and the total amount of memory is $O(N^d b)$. The area of any chip that computes the d-dimensional DFT transform must be $\Omega(N^d b)$, and hence our design asymptotically optimal in its use of area. The same holds true for the remaining transforms. Further, any VLSI system that computes the d-dimensional DFT on $N^d$ points requires area $A = \Omega)N^d b)$, where b is the number of bits required to represent each input number.

Therefore the present invention's design uses the least amount of memory asymptotically. The speed of the VLSI design cannot be improved asymptotically since it processes the input in real time. Hence the present invention's design is asymptotically optimal in both speed and area.

What is claimed is:

1. A two-dimensional transform processor which uses at least one discrete cosine transform (DCT) processor to produce an N-dimensional transform without transposition and provides a fully pipelined structure with a throughput rate of N clock cycles for an $N \times N$ successive serial input data with parallel output data comprising:

a serial input connected to inputs of a first lattice army having N lattice modules;
   said first lattice array having outputs for providing a non-inverted information output and an inverted information output, said first lattice array for computing a first 1-dimensional discrete cosine transform;
   said non-inverted information output coupled to at least one shift array;
   said shift array interconnected to a first half of a second lattice array for even transforms and thus forming an even transform lattice array;
   said even transform lattice array interconnected to a first shift register array, said first shift register array having a feedback interconnection between an output and an input thereof;
   said inverted information output coupled to at least one other shift array;
   said shift army interconnected to a second half of said second lattice array for odd transforms and thus forming an odd transfer lattice array; and
   said odd transform lattice array interconnected to a second shift register array, said second shift register array having a feedback interconnection between output and input thereof.

2. The processor recited in claim 1, wherein said lattice modules comprise a modified normal form digital filter.

3. The processor recited in claim 1, wherein said first and second lattice arrays have outputs which are reset every N and $N^2$ clock cycles of a clocking device.

4. The processor recited in claim 1, wherein said shift register arrays provide means to load an N×1 data vector from said first lattice array every N clock cycles, shift data circularly and send said data to said second lattice array every clock cycle.

5. The processor recited in claim 1, wherein said first and said shift register arrays comprise two N×N registers each.

6. The processor recited in claim 1, wherein said first lattice array has a feedback loop containing a delay stage and a direct adder.

7. The processor recited in claim 1, wherein all of said lattice modules comprise ROMs, each of said lattice modules having inputs and at least two outputs.

8. The processor recited in claim 7, wherein all of said lattice modules have said first outputs of each of said ROM summed together to provide one of said outputs of said lattice array.

9. The processor recited in claim 7, wherein all of said lattice modules have said second outputs of each ROM summed together to provide one of said outputs of said lattice array.

10. The processor recited in claim 7, wherein all of said ROMs provide both multiplier functions and transform algorithm functions.

11. A two-dimensional transform processor which uses at least one one-dimensional transform processor to produce an N-dimensional transform without transposition and provides a fully pipelined structure with a throughput rate of N clock cycles for an N×N successive serial input data with parallel or serial output data comprising:

a serial input connected to inputs of a first filter array having N IIR filter modules;

said first IIR filter array having outputs for providing both non-inverted information output and inverted information output, said first IIR filter array for computing a first 1-dimensional discrete cosine transform;

said non-inverted information output coupled to at least one shift array;

said shift array interconnected to a first half of a second IIR filter array for even transforms and thus forming an even transform IIR filter array;

said even transform IIR filter array interconnected to a first shift register array, said first shift register array having a feedback interconnection between an output and an input thereof;

said inverted information output coupled to at least one other shift array;

said shift array interconnected to a second half of said second IIR filter array for odd transforms and thus forming an odd transform IIR filter array; and said odd transform IIR filter array interconnected to a second shift register array, said second shift register array having a feedback interconnection between output and input thereof.

12. The processor recited in claim 11, wherein said IIR filter modules comprise a 2nd order filter.

13. The processor recited in claim 11, wherein said first and second IIR arrays each have outputs reset every N and $N^2$ clock cycles of a clocking device.

14. The processor recited in claim 11, wherein said shift register arrays provide means to load an N×1 data vector from said first lattice array every N clock cycles, shift data circularly and send said data to said second IIR filter array every clock cycle.

15. The processor recited in claim 11, wherein said shift register arrays each comprise two N×N registers.

16. The processor recited in claim 11, wherein said first lattice array has a feedback loop which contains a delay stage and a direct adder.

17. The processor recited in claim 11, wherein said IIR filter modules comprise ROMs, each of said IIR filter modules having inputs and at least two outputs.

18. The processor recited in claim 17, wherein said IIR filter modules have said first outputs of each of said ROMs summed together to provide one of said outputs of said IIR filter.

19. The processor recited in claim 18, wherein said ROMs provide both multiplier functions and transform algorithm functions.

20. The processor recited in claim 19, wherein said ROMs have coefficients derived for specific transform functions.

21. The processor recited in claim 11, wherein said processor provides discrete cosine transforms (DCT), discrete sine transforms (DST) and discrete Hartley transforms (DHT) where a number of multiplier functions is 2N.

22. The processor recited in claim 11, wherein said processor provides discrete Fourier transform (DFT), dual discrete cosine transform and discrete sine transform where a number of the multiplier functions is 3N.

23. A N-dimensional transform processor as recited in claim 11 having an optimal architecture providing only 1.5N multipliers.

* * * * *